(12) United States Patent
Chang et al.

(10) Patent No.: US 9,203,784 B2
(45) Date of Patent: Dec. 1, 2015

(54) DISTRIBUTED VIRTUAL SWITCH ARCHITECTURE FOR A HYBRID CLOUD

(75) Inventors: David W. Chang, Milpitas, CA (US); Abhijit Patra, Saratoga, CA (US); Nagaraj A. Bagepalli, Fremont, CA (US); Kyle Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 13/454,528

(22) Filed: Apr. 24, 2012

(65) Prior Publication Data

US 2013/0283364 A1    Oct. 24, 2013

(51) Int. Cl.
| | | |
|---|---|---|
| G06F 21/00 | (2013.01) | |
| H04L 12/931 | (2013.01) | |
| H04L 12/70 | (2013.01) | |
| H04L 12/46 | (2006.01) | |

(52) U.S. Cl.
CPC ............ *H04L 49/70* (2013.01); *H04L 12/4633* (2013.01); *H04L 12/4641* (2013.01); *H04L 12/462* (2013.01); *H04L 12/4625* (2013.01); *H04L 2012/5617* (2013.01)

(58) Field of Classification Search
CPC . H04L 12/4625; H04L 63/0272; H04L 49/70; H04L 12/462; H04L 12/4633
USPC .......................................................... 726/12
See application file for complete search history.

(56) References Cited

U.S. PATENT DOCUMENTS

| 1,026,182 | A1 | 10/2011 | Smith | |
|---|---|---|---|---|
| 8,345,692 | B2 | 1/2013 | Smith | |
| 8,514,868 | B2 * | 8/2013 | Hill ............................... | 370/401 |
| 8,560,663 | B2 * | 10/2013 | Baucke et al. ................ | 709/223 |
| 8,719,804 | B2 * | 5/2014 | Jain ................................ | 717/140 |
| 8,856,339 | B2 * | 10/2014 | Mestery et al. ............... | 709/226 |
| 2011/0261828 | A1 * | 10/2011 | Smith ........................... | 370/401 |
| 2011/0276951 | A1 * | 11/2011 | Jain ................................ | 717/140 |
| 2012/0179909 | A1 * | 7/2012 | Sagi et al. ..................... | 713/167 |

(Continued)

FOREIGN PATENT DOCUMENTS

| EP | 2228719 A1 | 9/2010 |
|---|---|---|
| EP | 2439637 A1 | 4/2012 |

OTHER PUBLICATIONS

Pozzi, et al, "Notification of Transmittal of the International Saerch Report and the Written Opinion of the International Searching Authority, or the Declaration", Patent Cooperation Treaty, International Application No. PCT/US2013/037842, 10 Pages, Jul. 5, 2013, European Patent Office, Rijswijk, Netherlands.

*Primary Examiner* — Linglan Edwards
(74) *Attorney, Agent, or Firm* — Parker Ibrahim & Berg LLC; James M. Behmke; Stephen D. LeBarron

(57) ABSTRACT

In one embodiment, a secure transport layer tunnel may be established over a public network between a first cloud gateway in a private cloud and a second cloud gateway in a public cloud, where the secure transport layer tunnel is configured to provide a link layer network extension between the private cloud and the public cloud. In addition, a cloud virtual Ethernet module (cVEM) may be executed (instantiated) within the public cloud, where the cVEM is configured to switch inter-virtual-machine (VM) traffic between the private cloud and one or more private application VMs in the public cloud connected to the cVEM.

15 Claims, 22 Drawing Sheets

(56) References Cited

U.S. PATENT DOCUMENTS

| | | | |
|---|---|---|---|
| 2012/0265976 A1* | 10/2012 | Spiers et al. | 713/2 |
| 2012/0311568 A1* | 12/2012 | Jansen | 718/1 |
| 2013/0036213 A1 | 2/2013 | Hasan et al. | |
| 2013/0152175 A1 | 6/2013 | Hromoko et al. | |
| 2013/0179941 A1* | 7/2013 | McGloin et al. | 726/3 |
| 2013/0182712 A1 | 7/2013 | Aguayo et al. | |
| 2013/0268588 A1 | 10/2013 | Chang et al. | |
| 2013/0268799 A1 | 10/2013 | Mestery et al. | |

\* cited by examiner

DISTRIBUTED VIRTUAL SWITCH ARCHITECTURE FOR A HYBRID CLOUD

TECHNICAL FIELD

The present disclosure relates generally to computer networks, and, more particularly, to hybrid cloud technologies.

BACKGROUND

According to the National Institute of Standards and Technology (NIST), a "hybrid cloud" is a cloud infrastructure composed of two or more clouds that inter-operate or federate through technology. In essence, a hybrid cloud is an interaction between private and public clouds where a private cloud joins a public cloud and utilizes public cloud resources in a secure and scalable way. The hybrid cloud model provides the key advantages over others cloud models, such as by allowing enterprises to protect their existing investment, and maintain control of their sensitive data and applications, as well as their network, computing, and storage resources. In addition, hybrid clouds allow enterprises to readily scale their environment on demand.

While many applications will remain within corporate datacenters, there are others whose dynamic compute requirements make them good candidates for the cloud. For such applications, the challenge is to take advantage of the computing elasticity and economics of cloud computing without sacrificing the security the information assets (e.g., database, directories, repositories) gain from being located on-premise within the business' datacenters. To be a viable hybrid cloud solution, data must be kept secure, applications need not be re-architected, and clouds should be readily mobile.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
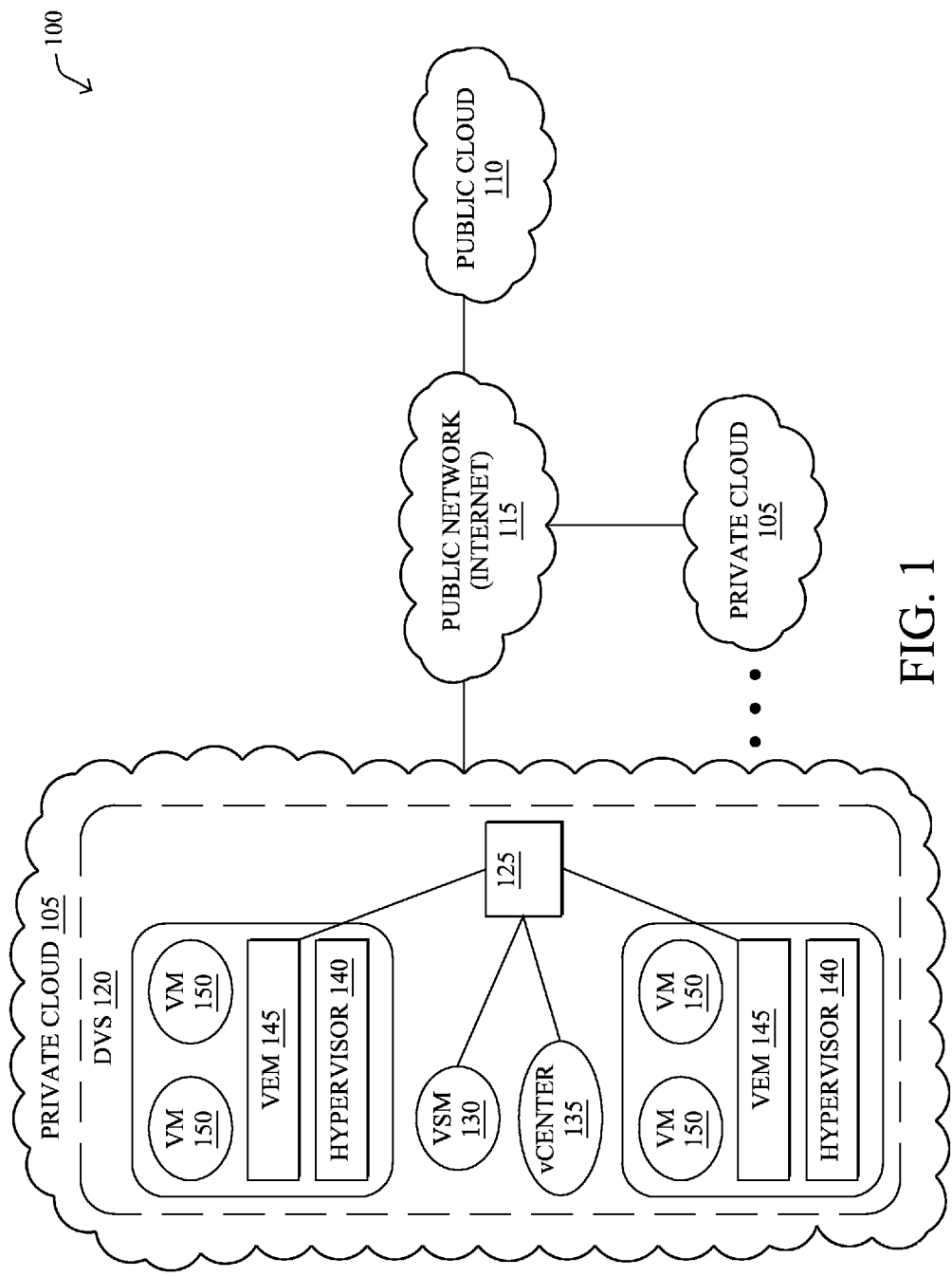
FIG. 1 illustrates an example hybrid cloud network.

According to one or more embodiments of the disclosure, a secure transport layer tunnel may be established over a public network between a first cloud gateway in a private cloud and a second cloud gateway in a public cloud, where the secure transport layer tunnel is configured to provide a link layer network extension between the private cloud and the public cloud. In addition, a cloud virtual Ethernet module (cVEM) may be executed (instantiated) within the public cloud, where the cVEM is configured to switch inter-virtual-machine (VM) traffic between the private cloud and one or more private application VMs in the public cloud connected to the cVEM. In this manner, an instance of a particular private application VM may be migrated between a virtual Ethernet module (VEM) of the public cloud and the cVEM of the private cloud, where the particular private application VM is managed by a virtual supervisor module (VSM) of the private cloud as though the cVEM and VMs in the public cloud were within the private cloud.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Cloud computing can be generally defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), processing devices (brute force processing capability), storage devices (e.g., servers, network attached storages, storage area network devices), etc., and may be used for instantiation of VMs, databases, applications (Apps), etc.

As noted above, a "hybrid cloud" is a cloud infrastructure composed of two or more clouds that inter-operate or federate through technology. In essence, a hybrid cloud is an interaction between private and public clouds where a private cloud joins a public cloud and utilizes public cloud resources in a secure and scalable way. While many applications will remain within corporate datacenters, there are others whose dynamic compute requirements make them good candidates for the cloud. For such applications, the challenge is to take advantage of the computing elasticity and economics of cloud computing without sacrificing the security the information assets (e.g., database, directories, repositories) gain from being located on-premise within the business' datacenters. To be a viable hybrid cloud solution, data must be kept secure, applications need not be re-architected, and clouds should be readily mobile.

FIG. 1 illustrates an example hybrid cloud network 100 illustratively comprising a plurality of networks or "clouds," such as one or more private clouds (or datacenters) 105 (e.g., enterprise datacenters) and at least one public cloud (or datacenter) 110 separated by a public network 115, such as the Internet. Data packets/traffic may be exchanged among the devices of the network 100 using predefined network communication protocols as will be understood by those skilled in the art. Those skilled in the art will understand that any number of computing resources, devices, links, etc. may be used in network 100, and that the view shown herein is for simplicity.

As detailed within one illustrative private cloud 105, a distributed virtual switch (DVS) 120 may be composed of a switch 125 (physical or virtual) configured with a virtual supervisor module (VSM) 130 and virtualization platform ("vCenter") 135, as may be appreciated by those skilled in the art. In particular, as will also be understood by those skilled in the art, the DVS 120 may comprise one or more embedded hypervisors 140, also called virtual machine managers (VMMs), that may each consist of a virtual Ethernet module (VEM) 145 and one or more VMs 150.

Figure 2:
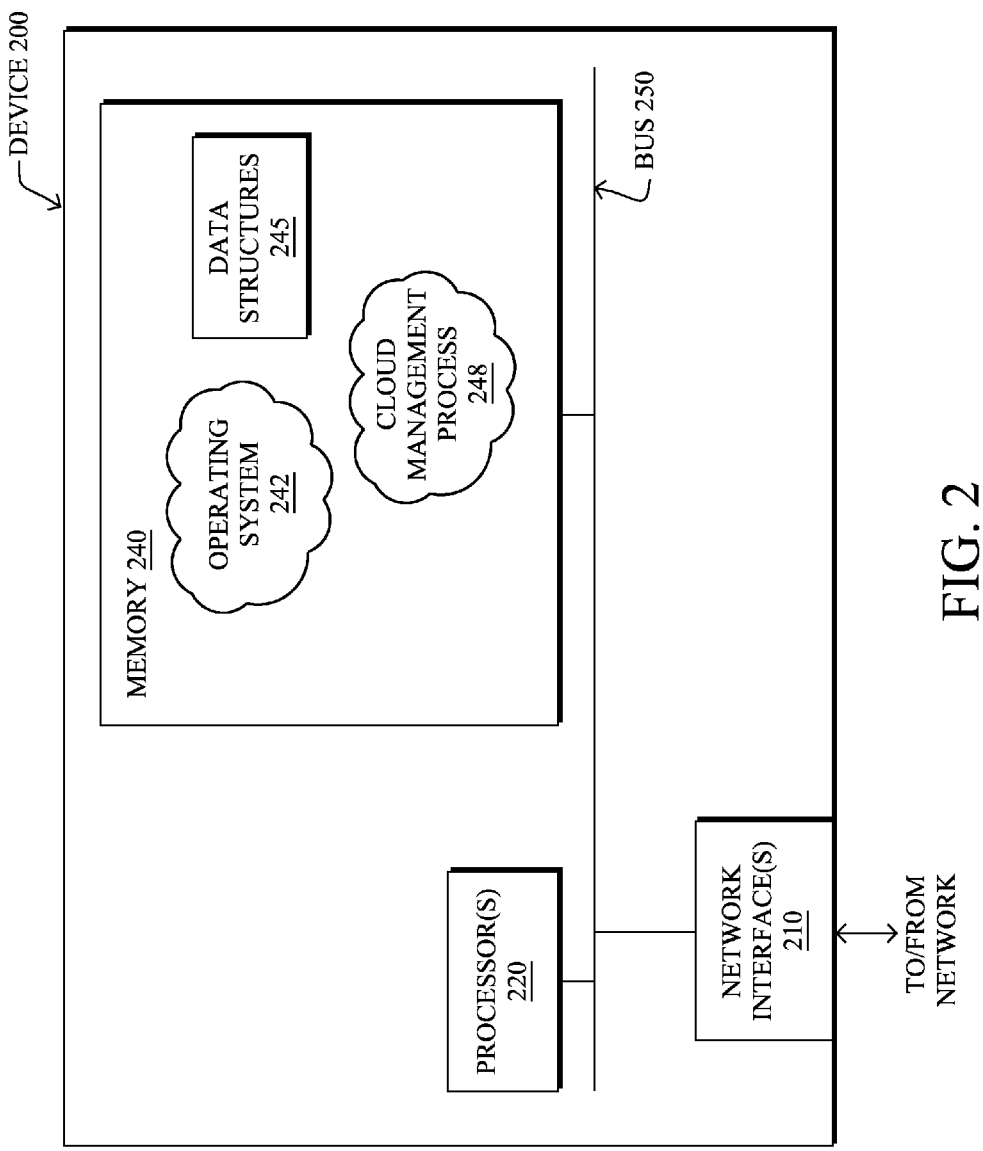
FIG. 2 illustrates an example device, e.g., a cloud manager device.

FIG. 2 is a schematic block diagram of an example simplified computing device 200 that may be used with one or more embodiments described herein, e.g., particularly as a server 125, or, more particularly, as a representation of one or more devices of the DVS 120 (e.g., a cloud manager device 375, described below). The illustrative "device" 200 may comprise one or more network interfaces 210, at least one processor 220, and a memory 240 interconnected by a system bus 250. Network interface(s) 210 contain the mechanical, electrical, and signaling circuitry for communicating data over links coupled to network 100. The network interfaces 210 may be configured to transmit and/or receive data using a variety of different communication protocols, as will be understood by those skilled in the art. The memory 240 comprises a plurality of storage locations that are addressable by processor 220 for storing software programs and data structures associated with the embodiments described herein. The processor 220 may comprise necessary elements or logic adapted to execute the software programs and manipulate data structures 245. An operating system 242, portions of which are typically resident in memory 240 and executed by the processor, functionally organizes the device by, inter alia, invoking operations in support of software processes and/or services executing on the device. These software processes and/or services may comprise an illustrative "cloud management" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having resource allocation process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As further noted above, current hybrid cloud technologies have generally resorted to what is referred to as an "open virtual private network (VPN) overlay" or else an "IP security (IPSec) VPN based L3 network extension." For instance, many early cloud adapters use Open VPN technology to create an overlay network in the cloud datacenter for connecting their cloud resources (public cloud 110) to the enterprise network (private cloud 105). While offering secure transport connections in a cloud environment, Open VPN does not provide a switch infrastructure for providing features such as switching network traffic locally at the cloud, providing consistent enterprise network polices, allowing insertion of various network services (e.g., load balancers, firewalls, etc.), and construction of a sophisticated network topology (e.g., the current systems are connected through a router and multiple VLANs).

Alternatively, to provide hybrid cloud network services, many virtualization platform vendors and cloud service providers currently offer IPSec VPN gateway products/services for their customers to build an enterprise network extension from a private cloud 105 to the public cloud 110. For example, IPsec VPN tunnel capability has been offered to enterprise customers to interconnect a vCenter 135 with a Virtual Data Center (VDC) allocated in a cloud provider datacenter 110. Another example provides a Virtual Private Cloud service for customers to build an IPSec-VPN-based hybrid cloud.

However, while providing customers the inter-datacenter network connectivity and relatively sophisticated network topologies, IPsec-VPN-based technology allows for only extending enterprise network at the network layer (Layer 3 or "L3" of the illustrative and well-known OSI model). This implies that the overlay networks created at the cloud datacenter (public cloud 110) must be a set of new subnets, where VMs in the public cloud are assigned with new network identities (e.g., IP and MAC addresses). Because of this, many of enterprise infrastructures (e.g., access control lists, firewall policies, domain name services, etc.) must be modified in order for the newly attached VM systems to be able to work with rest of the enterprise systems. Even the IPSec VPN tunnel would cause problems in penetration of corporate firewalls and Network Address Translation (NAT) devices deep within the enterprise datacenter (private cloud 105). Accordingly, deployment of a hybrid cloud has conventionally been a complex and difficult task.

The techniques herein, therefore, propose a distributed virtual switch (DVS) architecture for hybrid cloud networks, where an L2 network switch overlay (infrastructure) may be dynamically created for connecting the private clouds 105 with the public cloud 110, thus extending private (e.g., enterprise) network segments to the cloud datacenter. In this manner, private clouds (enterprise customers) can migrate their applications and/or VMs to the public cloud and operate them using the elasticity of compute, network, and storage resources provided.

Specifically, according to one or more embodiments of the disclosure as described in detail below, a secure transport layer (e.g., Layer 4 or "L4") tunnel may be established over a public network 115 between a first cloud gateway in a private cloud 105 and a second cloud gateway in a public cloud 110, where the secure transport layer tunnel is configured to provide a link layer (e.g., Layer 2 or "L2") network extension between the private cloud and the public cloud. In addition, a cloud virtual Ethernet module (cVEM) may be executed (instantiated) within the public cloud, where the cVEM is configured to switch inter-VM traffic between the private cloud and one or more private application VMs in the public cloud connected to the cVEM. In this manner, an instance of a particular private application VM may be migrated between a virtual Ethernet module (VEM) 145 of the private cloud and the cVEM of the public cloud, where the particular private application VM is managed by a virtual supervisor module (VSM) 130 (e.g., and cloud manager) of the private cloud as though the cVEM and VMs in the public cloud were within the private cloud.

Illustratively, the techniques described herein may be performed by hardware, software, and/or firmware, such as in accordance with the illustrative "cloud management" process 248, which may contain computer executable instructions executed by the processor 220 of the one or more devices 200 (of switch 125 or DVS 120, or other suitable devices generally) to perform functions relating to the techniques described herein. For example, the techniques herein may be treated as extensions to conventional cloud management protocols, and as such, may be processed by similar components and devices understood in the art that execute those protocols, accordingly.

Figure 3:
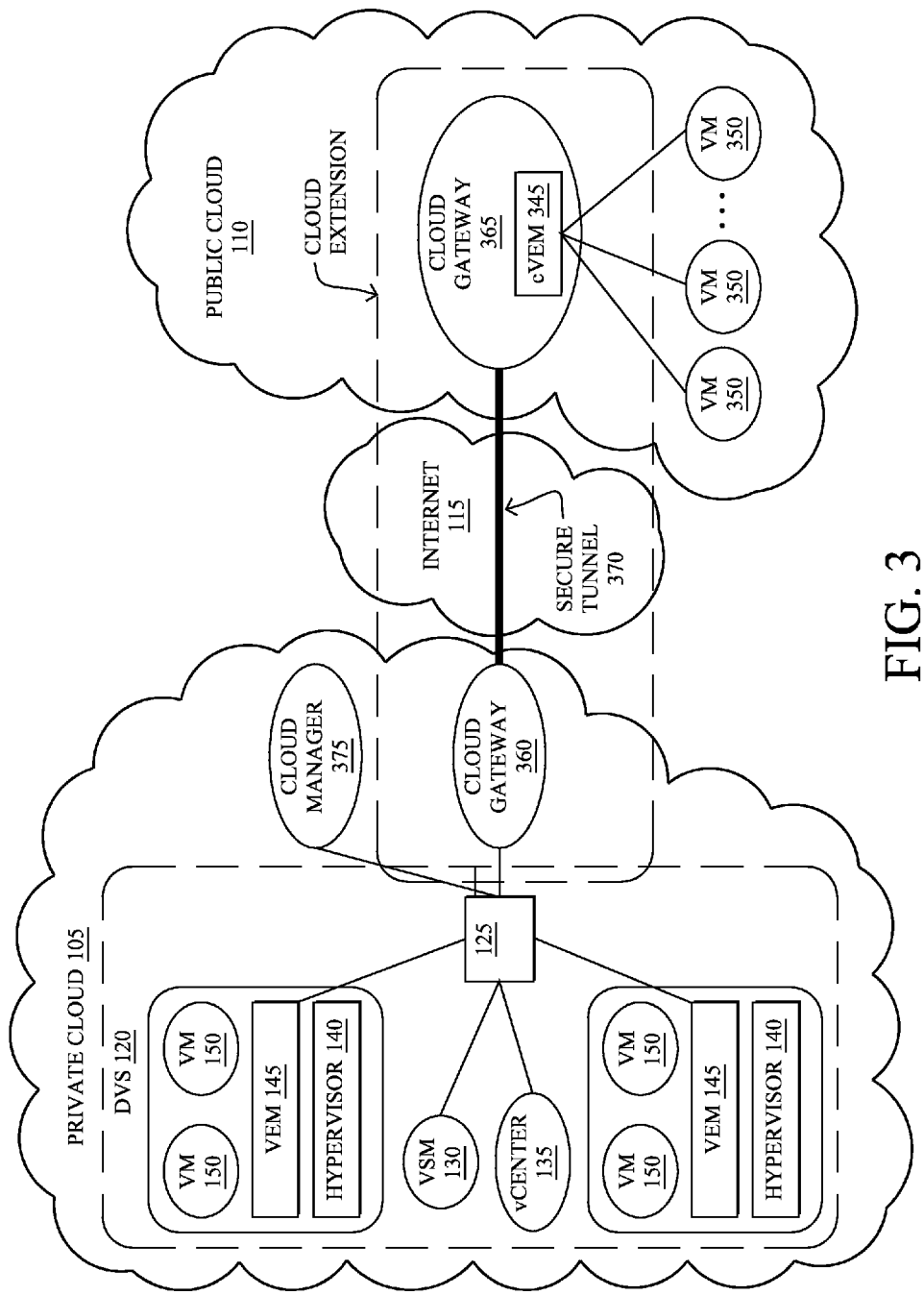
FIG. 3 illustrates an example cloud network element within the illustrative network of FIG. 1.

FIG. 3 is an example architecture showing an added cloud network element within the network of FIG. 1 according to one or more techniques described herein. In particular, the illustrative hybrid cloud solution deploys one or more VEMs at the public cloud as an extension of a Distributed Virtual Switch (DVS) 120, namely, "cloud VEMs" or "cVEMs." By establishing a secure transport layer (L4) tunnel 370 (e.g., transport layer security (TLS), datagram TLS (DTLS), secure socket layer (SSL), etc.) over the public network 115, the techniques herein build a secure L2 switch overlay that interconnects cloud resources (public cloud 110) with private clouds 105 (e.g., enterprise network backbones). In other words, the secure transport layer tunnel 370 provides a link layer network extension between the private cloud and the public cloud.

As depicted in FIG. 3, the cVEM 345 deployed at public cloud 110 shares the same VSM 130 with the other VEMs 145 installed in the private cloud 105 (e.g., enterprise). In this manner, the VSM 130 in the private cloud may manage the one or more private application VMs 350 in the public cloud as though the cVEM 345 and VMs 350 in the public cloud were within the private cloud.

Each cloud network element (with corresponding cVEM instance) consists of a cloud gateway 360 at the private cloud 105, a cloud gateway 365 at the public cloud 110, and one or more cloud VMs 350 (or nested VM containers) at the cVEM 345 within the public cloud. The cloud gateway 360 at the private cloud may be configured as a VM running in the private cloud (enterprise datacenter) that is responsible to establish the secure tunnel 370 for interconnecting the components in the public cloud with the private cloud. Conversely, the cloud gateway 365 at the public cloud may be configured as a VM running in the public cloud that is responsible to establish the secure tunnel for connecting the cloud gateway 360 with cloud resources. The cloud gateway 365 may also execute an embedded cVEM 345 for switching inter-VM traffic between the private cloud and one or more private application VMs 350 in the public cloud connected to the cVEM. In particular, the nested VM containers are cloud VMs (or cVMs) that execute in the public cloud and are responsible to run the private cloud's application VM image and to connect the application VM back to the private cloud. Note that in general, the number of cVMs 350 allowed per cVEM 345 is the same as the number of VMs 150 allowed per VEM 145 (e.g., per virtual line card).

For managing the cloud VMs 350, and for auto-provisioning resources within the hybrid cloud solution, the techniques herein also introduces a management plane VM illustratively within the private cloud 105, i.e., a cloud manager 375. Specifically, the cloud manager 375 is a management platform (which could be a VM) running in the private network, and may be generally responsible for providing the hybrid cloud operations, translating between private cloud and public cloud interfaces, management of cloud resources, dynamic instantiating of cloud gateways and nested VM container components (cloud VMs 350) though the private virtualization platform (e.g., vCenter) 135 and public cloud provider APIs. It may also health-monitor all the components (e.g., the cloud gateways, the one or more private application VMs, the cVEM, and the secure transport layer tunnel) and provides high availability of those components.

In order to maintain a consistent DVS management model, the VSM 130 deployed in the private cloud 105 may use the same port-profile and VM management model to manage the cloud resources connected to a cVEM 140 as it does for resources connected to a VEM 145. For network resources, this means the virtual network interface card (vNIC) interfaces on the VMs 350 running in the cloud are managed as Virtual Ethernet Interfaces (veths) on the VSM. Also, port-profiles allow for configuration to exist on the veths and be applied when the virtual machines are migrated to the public cloud. If the virtual machine is migrated back to the on-premise datacenter (private cloud), the same configuration will be applied to the veth at this time. In other words, a particular veth may be configured using a port-profile applicable to an instance of a particular private application VM whether instantiated within the public cloud (as VM 350) or within the private cloud (as VM 150). Additionally, the cVEM 345 itself may be managed in a similar way as a normal VEM 145. That is, the same protocol may be used to manage a datapath agent (DPA) on the cVEM as on the VEM. The DPA may thus program profile information down into the cVEM using the same interface as on an existing VEM, called the Datapath Agent API (DPA API).

As noted, and as shown in FIG. 3, the cloud gateway 360 deployed at the private cloud 105 uses an L4 Secure Tunnel to connect to the cloud resources allocated at public cloud 110. The L4 secure tunnel is well-suited for use with corporate firewalls and NAT devices due to the nature of the transport level protocols (e.g., UDP/TCP) and the transport layer ports opened for HTTP/HTTPS in the firewall. The L2 network is thus further extended and connected to each of the cloud VMs 350 through the cVEM components embedded within the cloud gateway 365 deployed at the public cloud 110. With an L2 network overlay, all instance of a particular private application VM can be seamlessly migrated to the overlay network dynamically created at the public cloud (i.e., between a VEM 150 and a cVEM 350), without any impacts to the existing corporate infrastructure.

As a general practice, a public cloud service provider offers only a limited number of network attachments for each of the cloud VMs 350 and network broadcasting capability. This prohibits enterprise customers when migrating their multi-VLAN network architectural environment into the public cloud datacenter. However, building an L2 network overlay on top of L4 tunnels as described herein reduces the network attachments requirements for cloud VMs 350 and provides cloud VMs with network broadcasting ability. The techniques herein thus allow enterprise customers to deploy consistent enterprise-wide network architectures, even in a hybrid cloud environment.

Figure 4A:
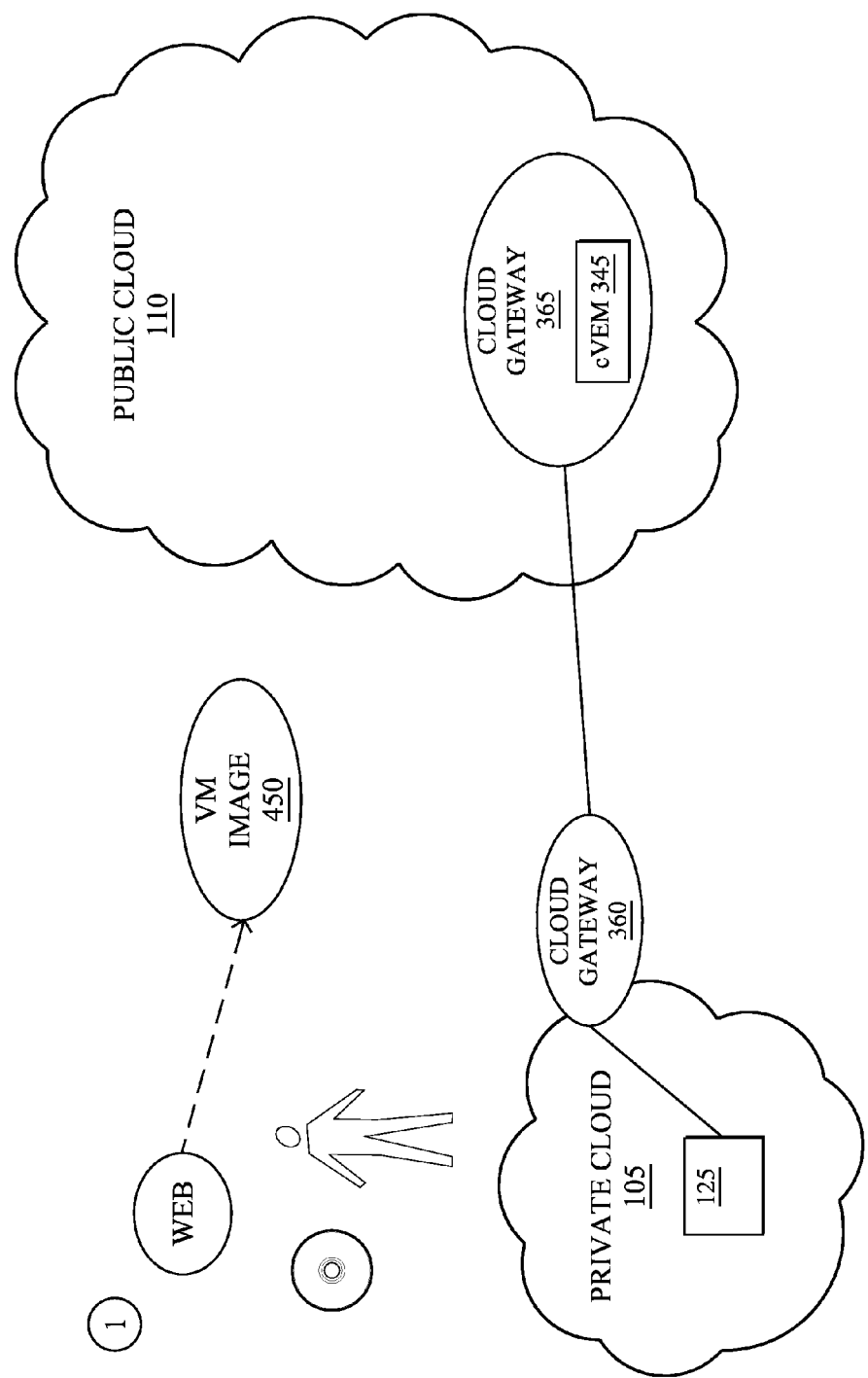
FIGS. 4A-4D illustrate an example of creating a virtual machine (VM) at a public cloud.
Figure 4B:
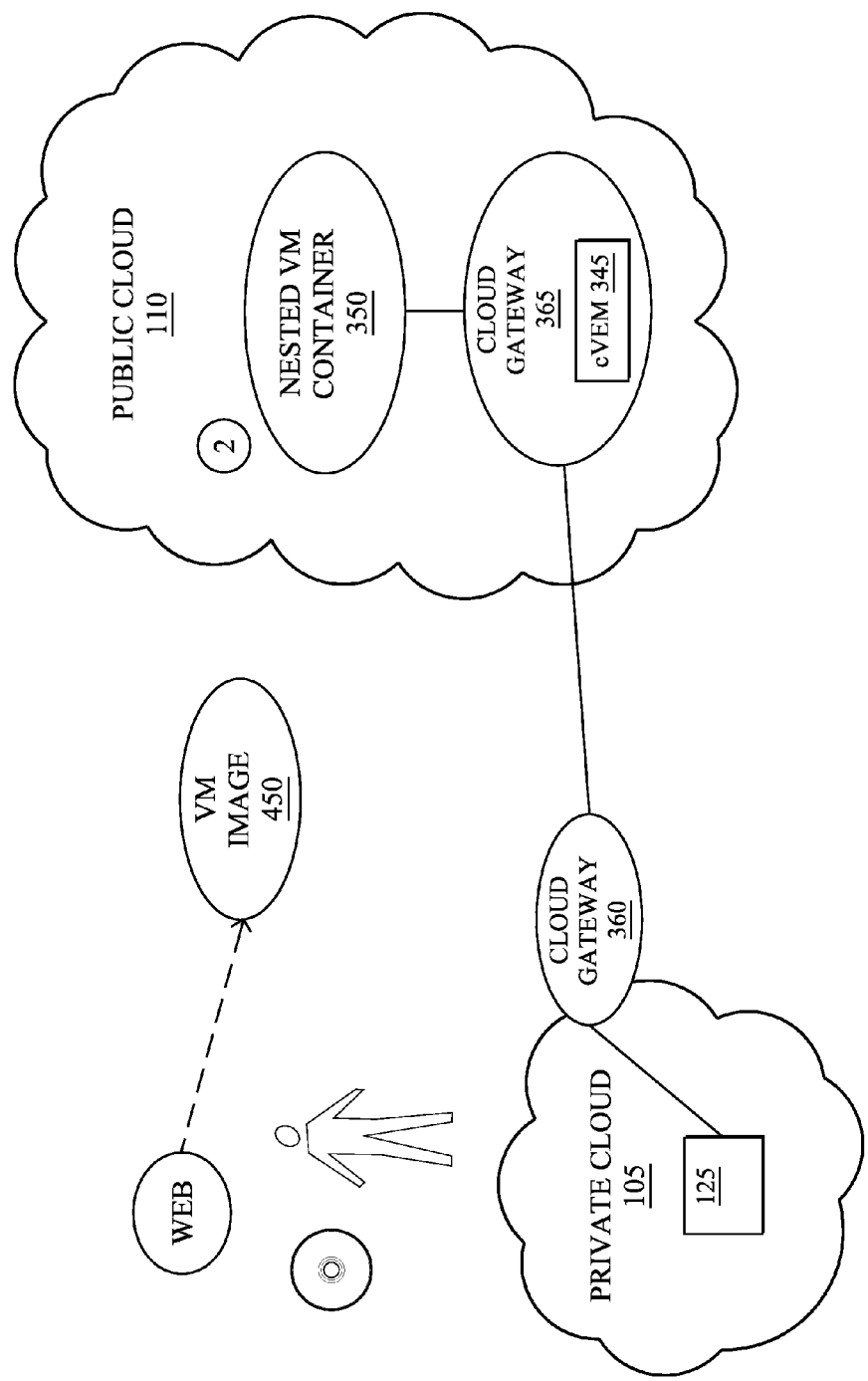
Figure 4C:
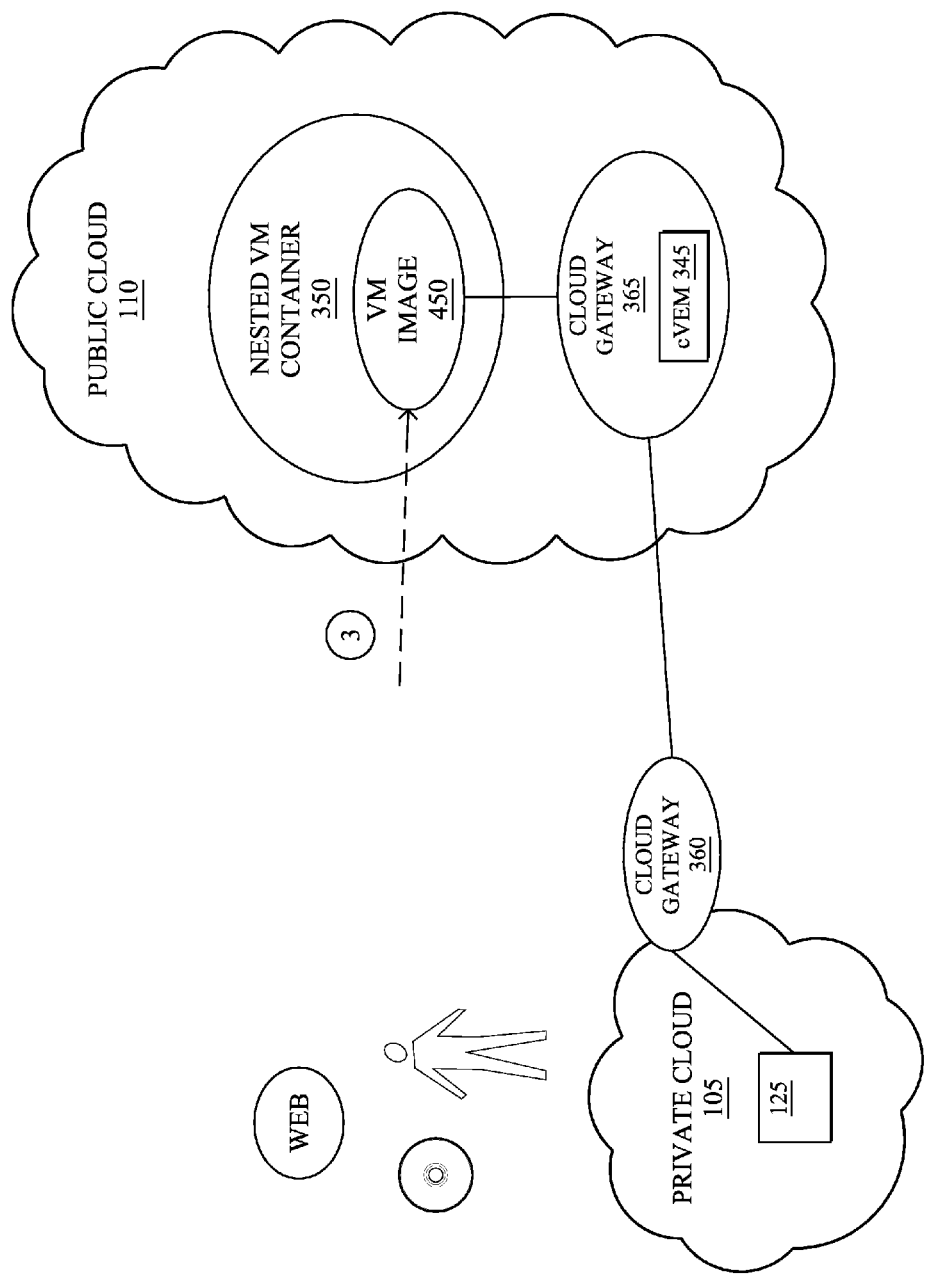
Figure 4D:
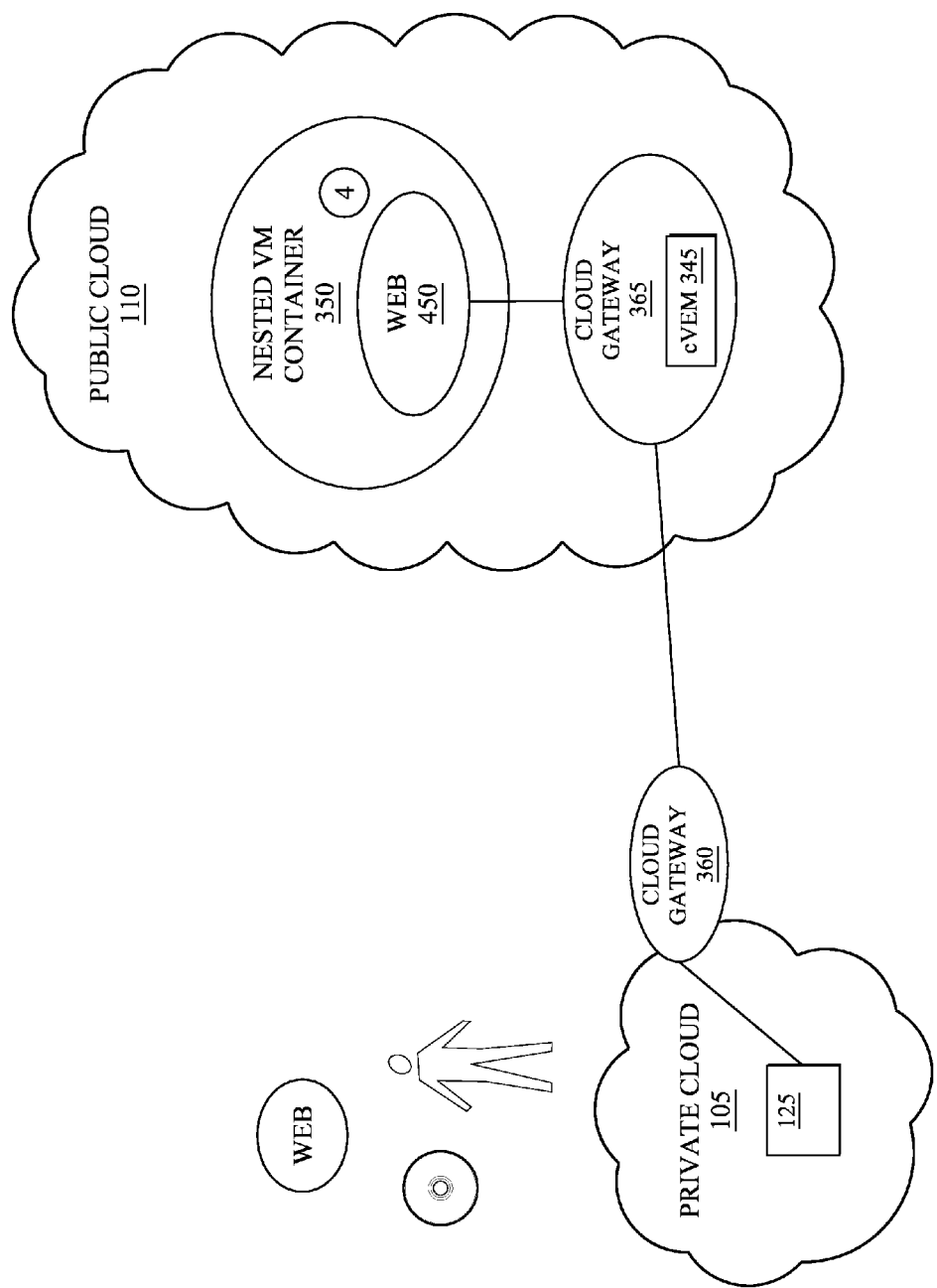

FIGS. 4A-9C demonstrate example operations that are available through the distributed virtual switch architecture for hybrid clouds as described above. In particular, as an introduction, FIGS. 4A-4D first illustrate an example of creating a VM 350 at a public cloud 110. First, as shown in FIG. 4A, a user creates a VM image 450 from either an image file (e.g., a .iso extension) or an existing VM template, such as a web server VM ("web"). Next, as shown in FIG. 4B, a VM container 350 may be created in the public cloud 110, and then as shown in FIG. 4C, the VM image may be moved to the cloud VM container 350 stored in the public cloud. As shown in FIG. 4C, the VM may be brought-up at the public cloud ("web") within the VM container 350, accordingly.

Figure 5A:
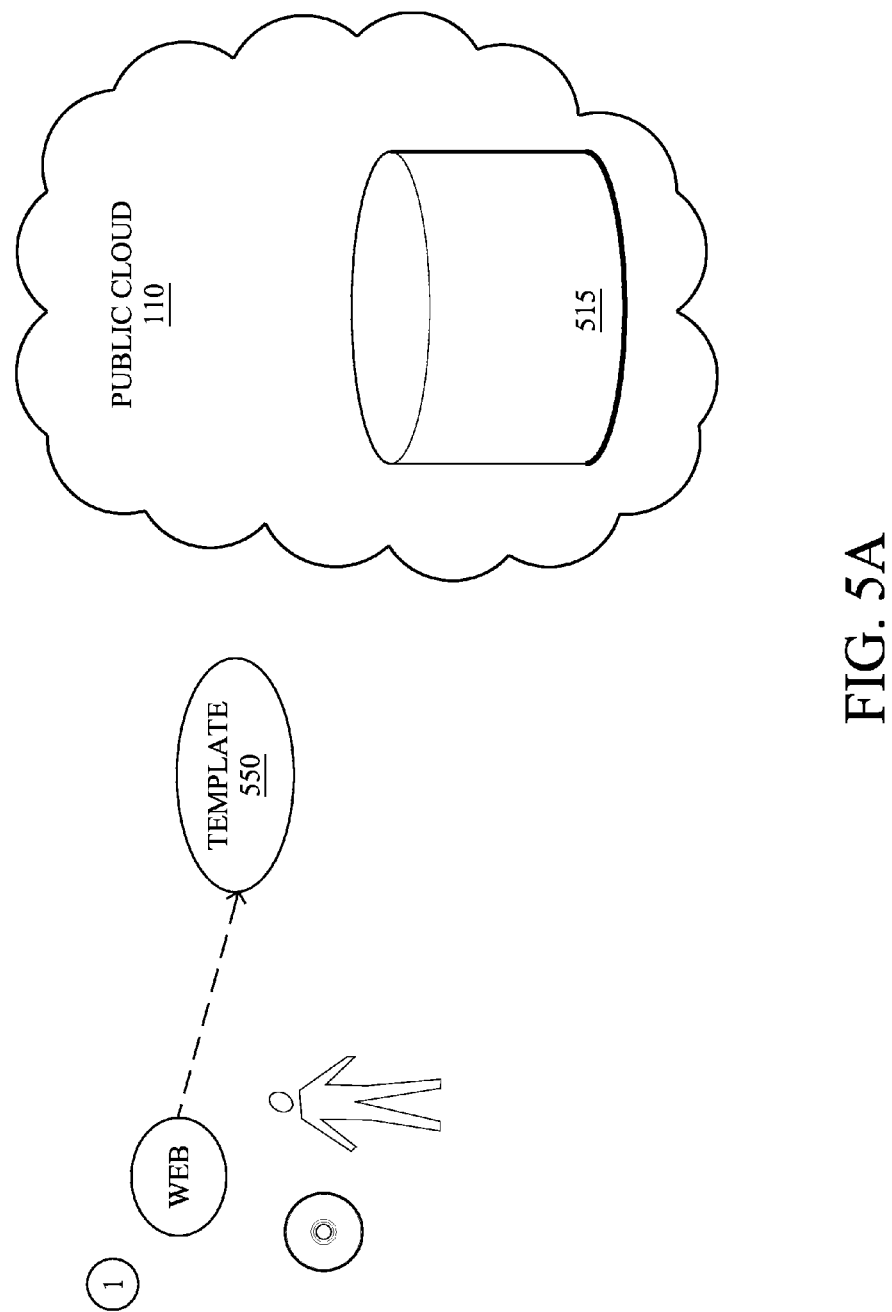
FIGS. 5A-5C illustrate an example of cloning a VM at a public cloud.
Figure 5B:
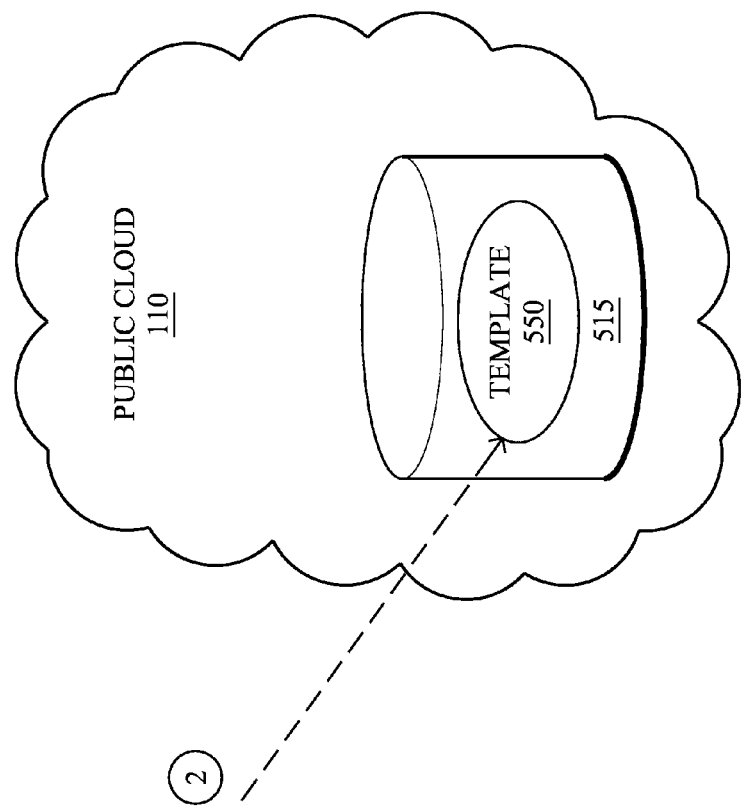
Figure 5B:
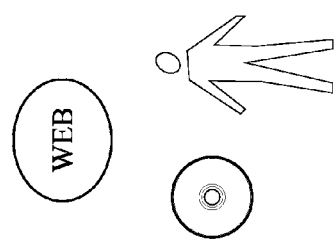
Figure 5C:
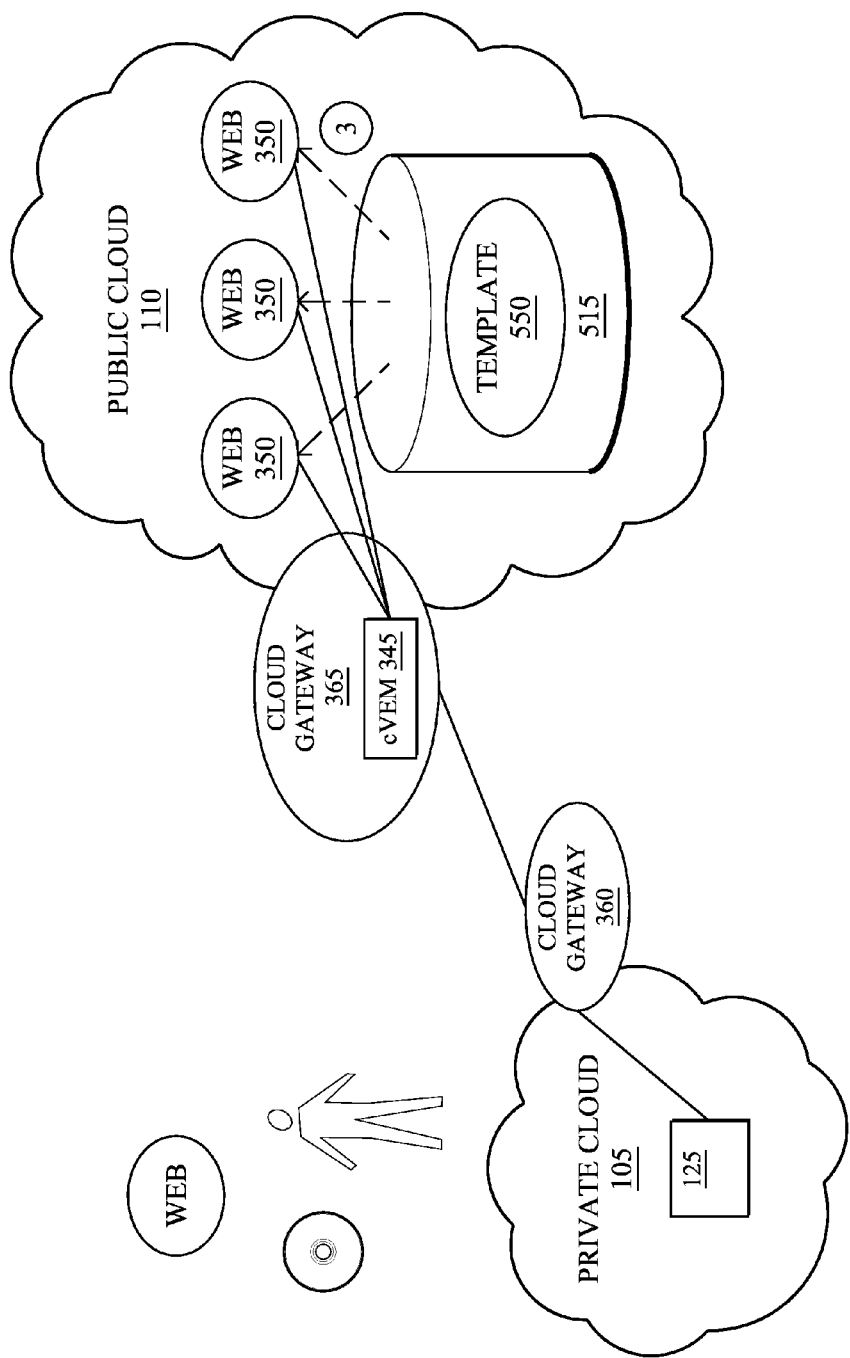

As an additional introduction, FIGS. 5A-5C illustrate an example of cloning a VM at a public cloud 110, where, as shown in FIG. 5A, a user may create a VM template 550 from either an image file (e.g., a .iso extension) or an existing VM template (e.g., "web"). Next, as shown in FIG. 5B, the VM template 550 is moved to a storage unit (e.g., database) 515 in the public cloud 110, and then as shown in FIG. 5C, VMs 350 may be cloned at the public cloud from the VM template 550, where a new IP address is assigned to each of the cloned VMs.

Figure 6A:
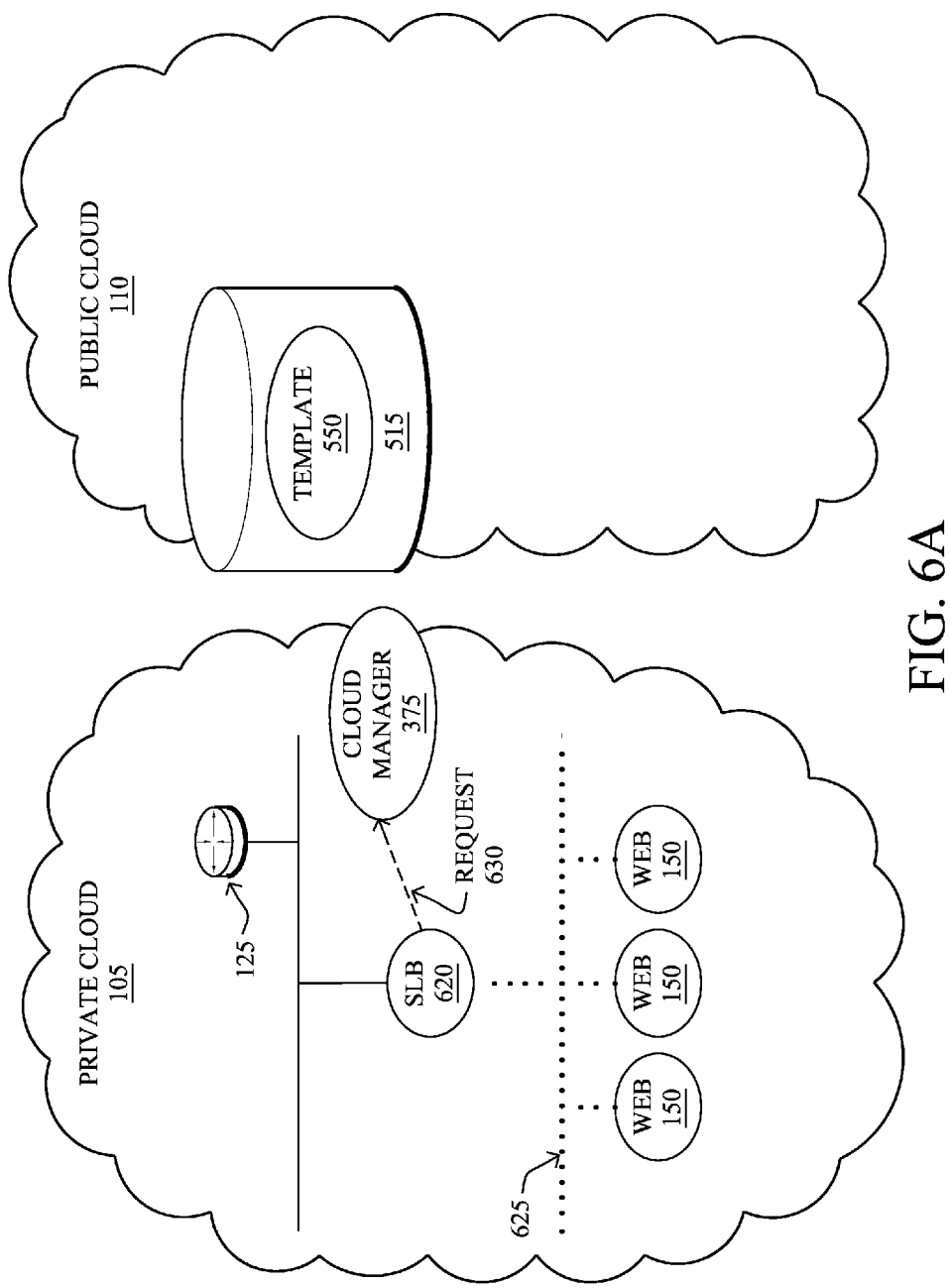
FIGS. 6A-6C illustrate an example use case of cloning a VM.
Figure 6B:
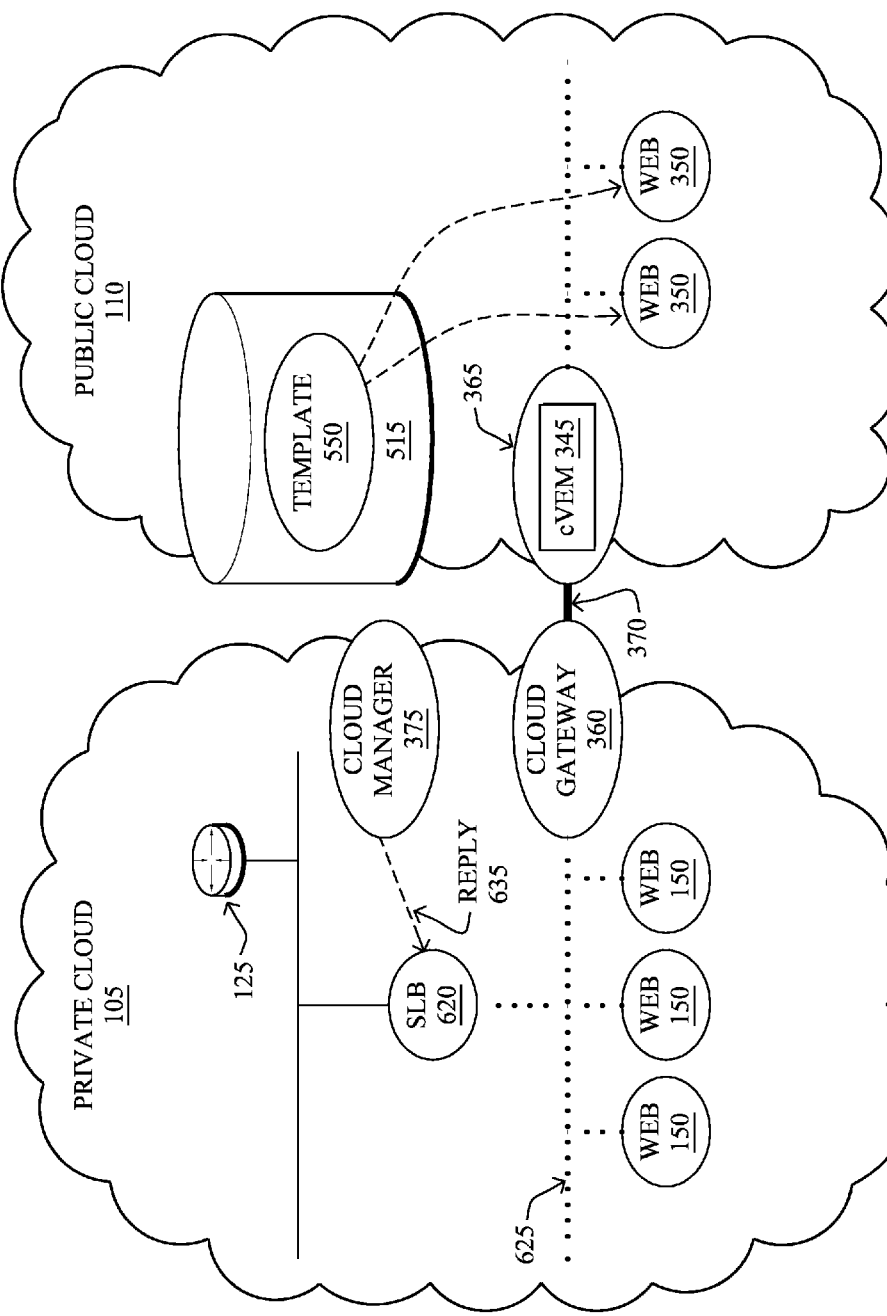
Figure 6C:
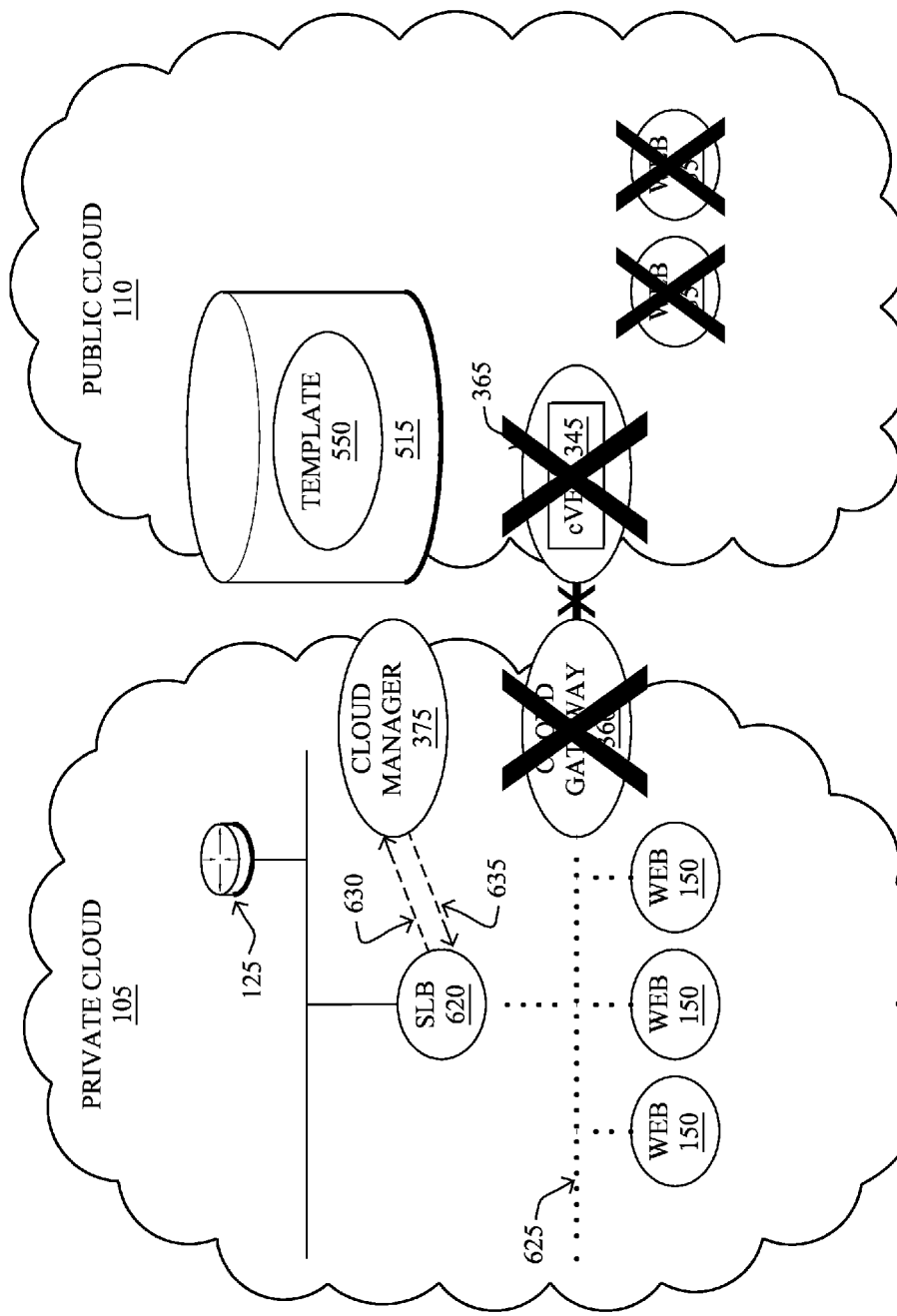

FIGS. 6A-6C, for instance, illustrate an example use case of cloning a VM at a cloud on demand in accordance with the techniques herein. In particular, as shown in FIG. 6A, a server load balancing (SLB) appliance 620 may be needed to distributed "north-south" traffic to all the web VMs 150 on a particular VLAN 625 (shown as dashed lines). Based on overall performance, the SLB 620 may submit requests 630 to the cloud manager 375 to add (or delete) cloud VMs 350 to/from the public cloud 110 (e.g., a server farm) on demand. For example, as shown in FIG. 6B, assume that two additional web VMs 350 are established (from template 550) through an instantiated cloud network element (cloud gateways 360/365, tunnel 370, cVEM 345) to meet the performance requirement (confirmed in a reply 635 from the cloud manager to the requesting device). In the event those cloud VMs 350 are no longer needed, as shown in FIG. 6C, another request/reply exchange may result in tearing down the un-needed VMs, as well as optionally the cloud network element (tunnel 370, etc.) itself, as it is no longer necessary.

Figure 7:
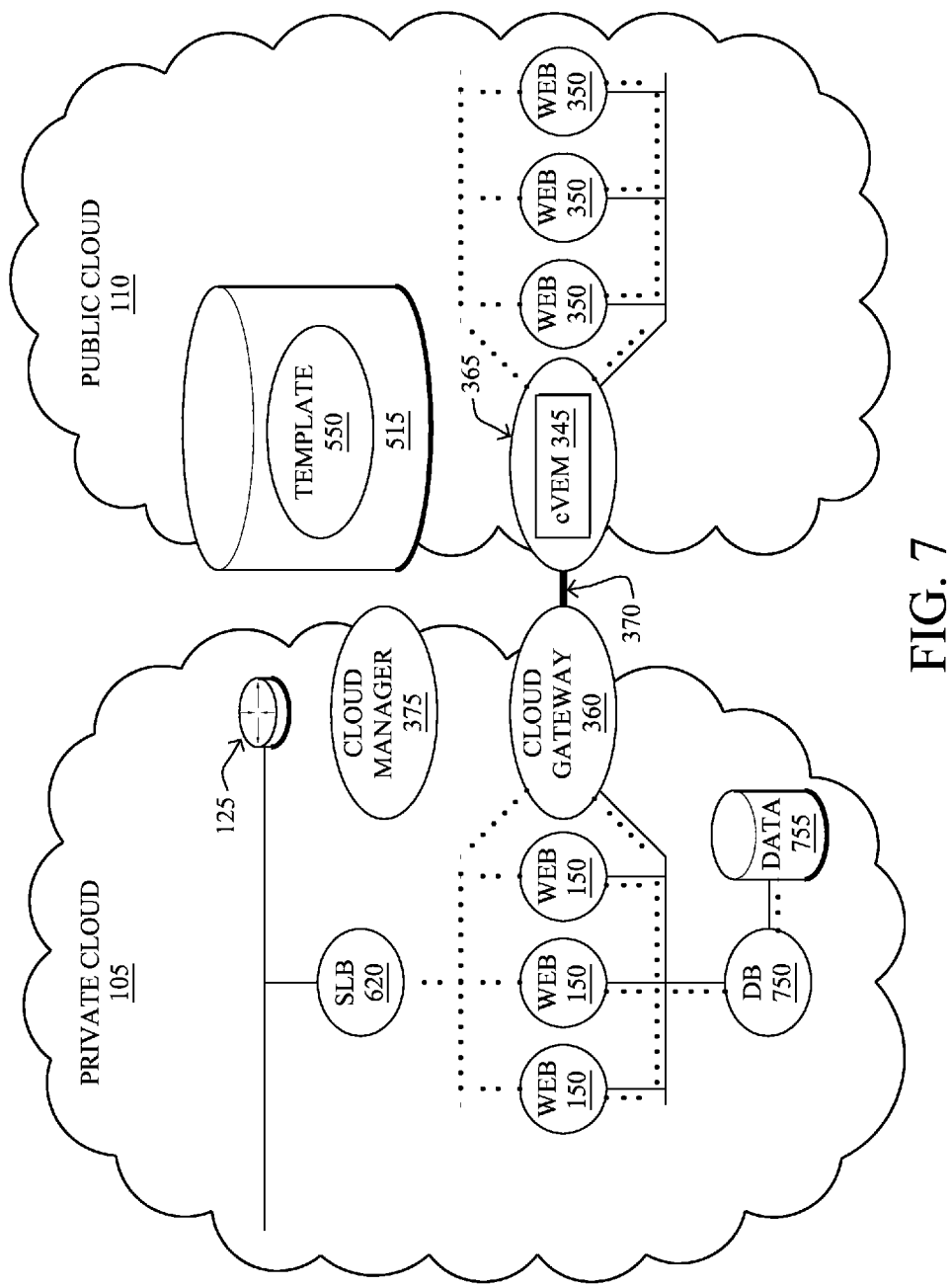
FIG. 7 illustrates another example use case of VM cloning.

FIG. 7 illustrates another example use case of VM cloning, similar to FIGS. 6A-6C, but with greater detail where the web VMs 150 and 350 are further interconnected to a database manager 750 (e.g., a VM or other device) and corresponding data container 755 illustratively located within the private cloud 105. Notably, the VMs 150 and 350 may both access the data 750/755, where the cloud VMs 350 access database manager 750 and data container 755 via the same secure tunnel 370, as shown.

Figure 8A:
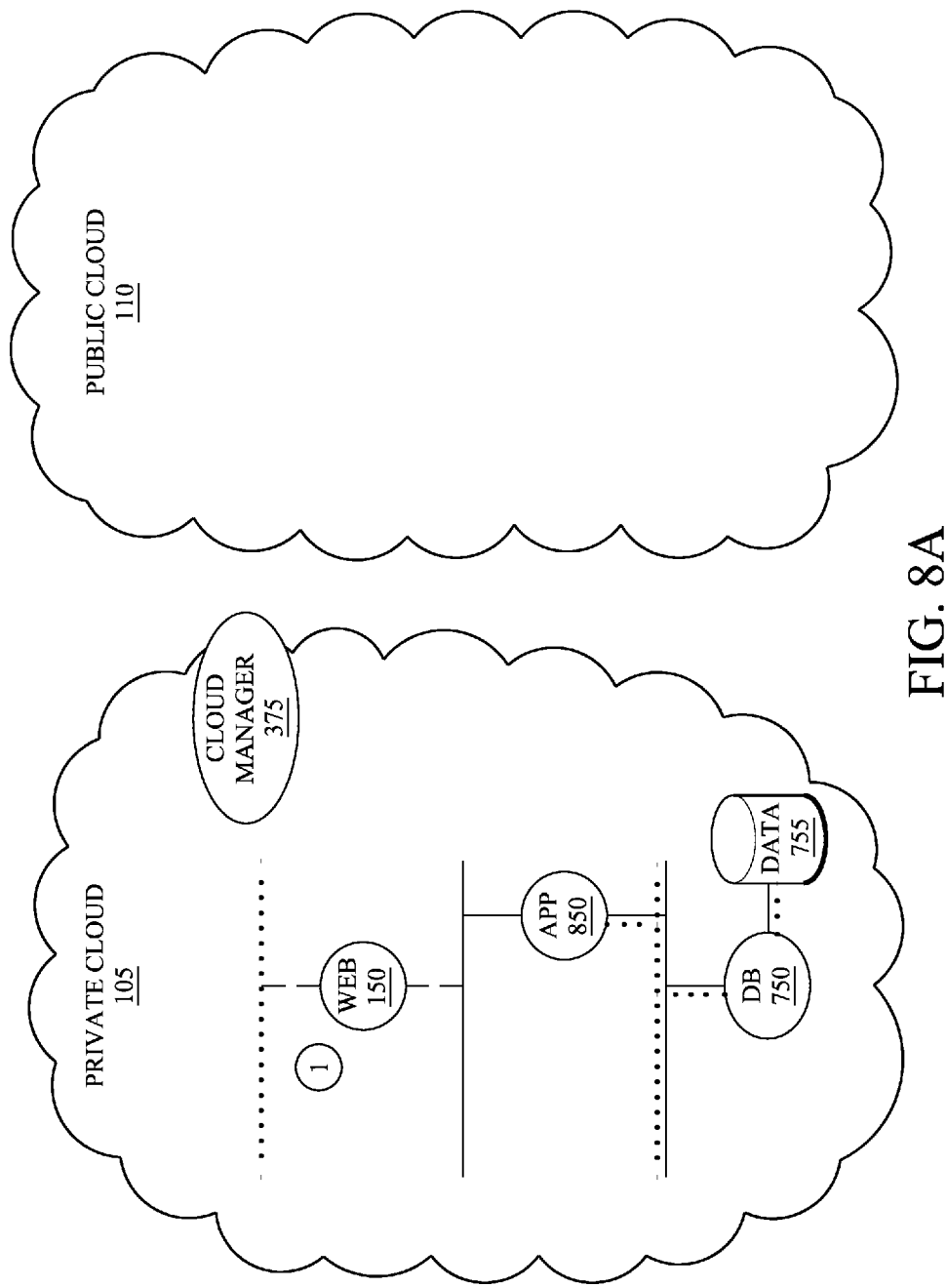
FIGS. 8A-8C illustrate an example of moving a VM to a public cloud.
Figure 8B:
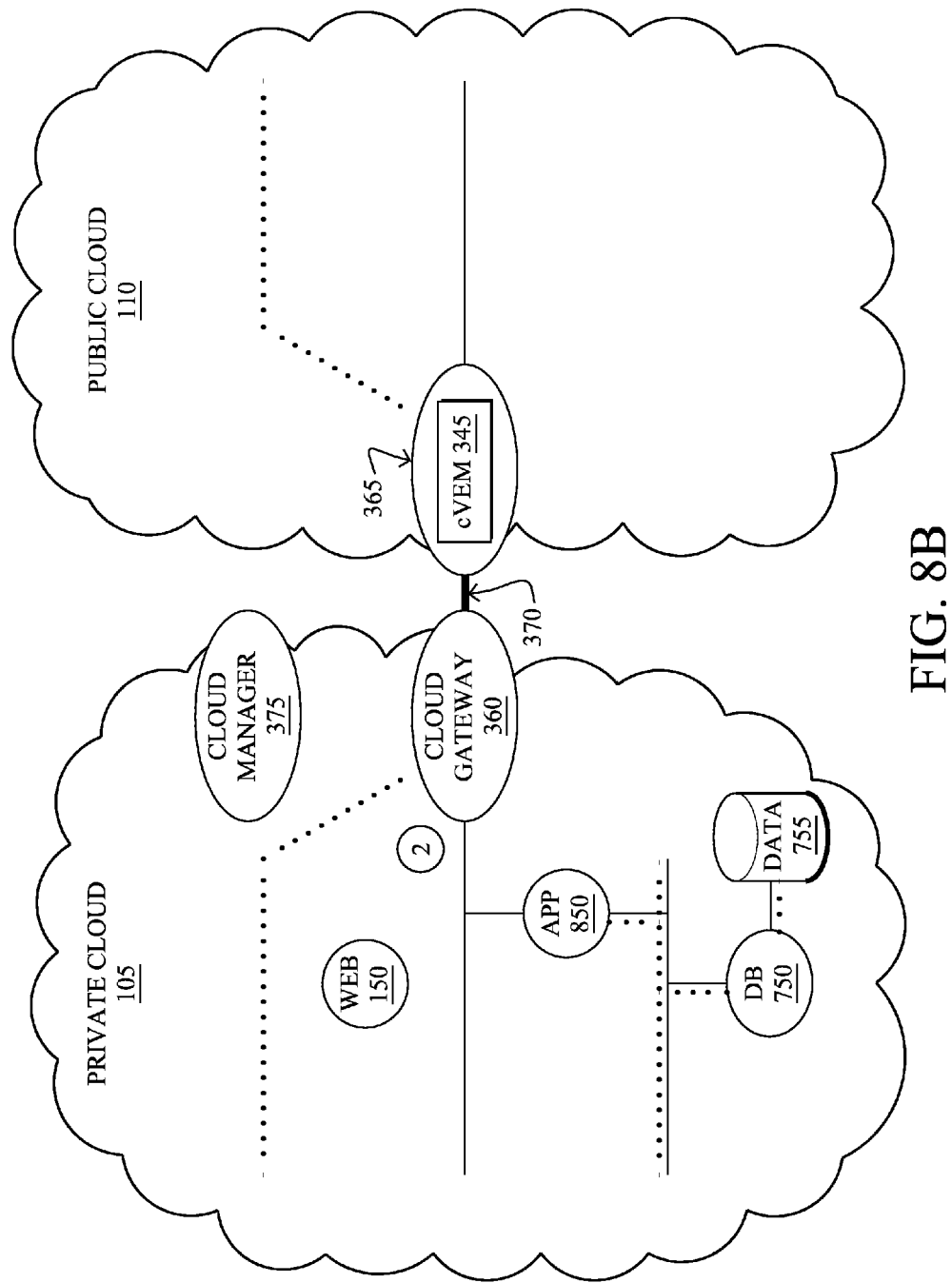
Figure 8C:
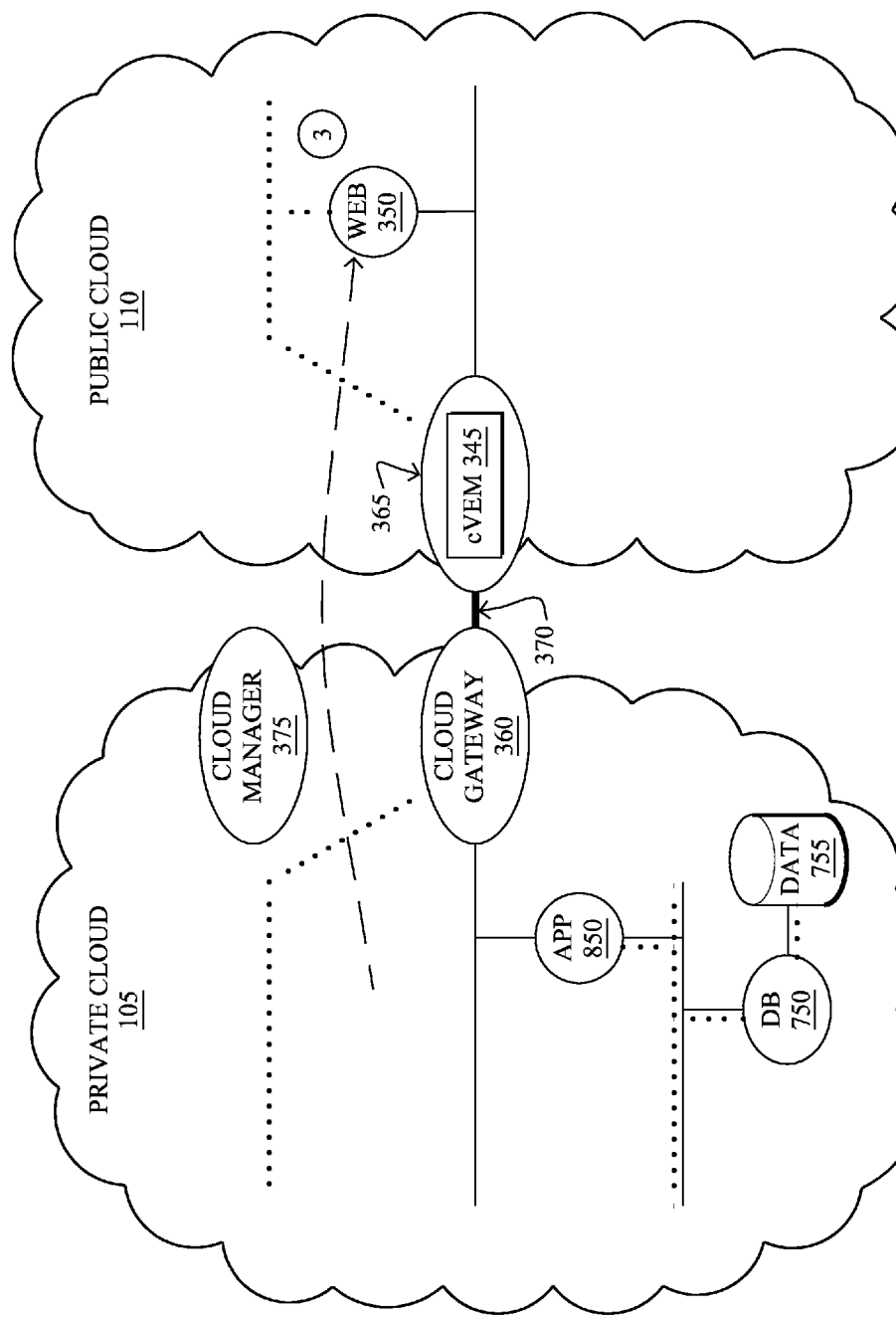

Further, FIGS. 8A-8C illustrate an example of moving a VM to a public cloud 110. In particular, FIG. 8A shows a user/administrator first powering off a particular web VM 150 (turning off shown as dotted lines) but not another application 850 (e.g., another VM) within the private cloud 105. The user may then request to the cloud manager 375 to move the web VM 150 to the public cloud. Accordingly, as shown in FIG. 8B, the cloud manager 375 may create a number of public cloud "network" segments, such as the could gateways 360 and 365, the secure transport layer tunnel 370, and the cVEM 345. As shown in FIG. 8C, the cloud manager may then instantiate a cloud VM container 350, and transfers the web VM images (from web VM 150) and data to the cloud VM 350 and activates it (brings it up).

Figure 9A:
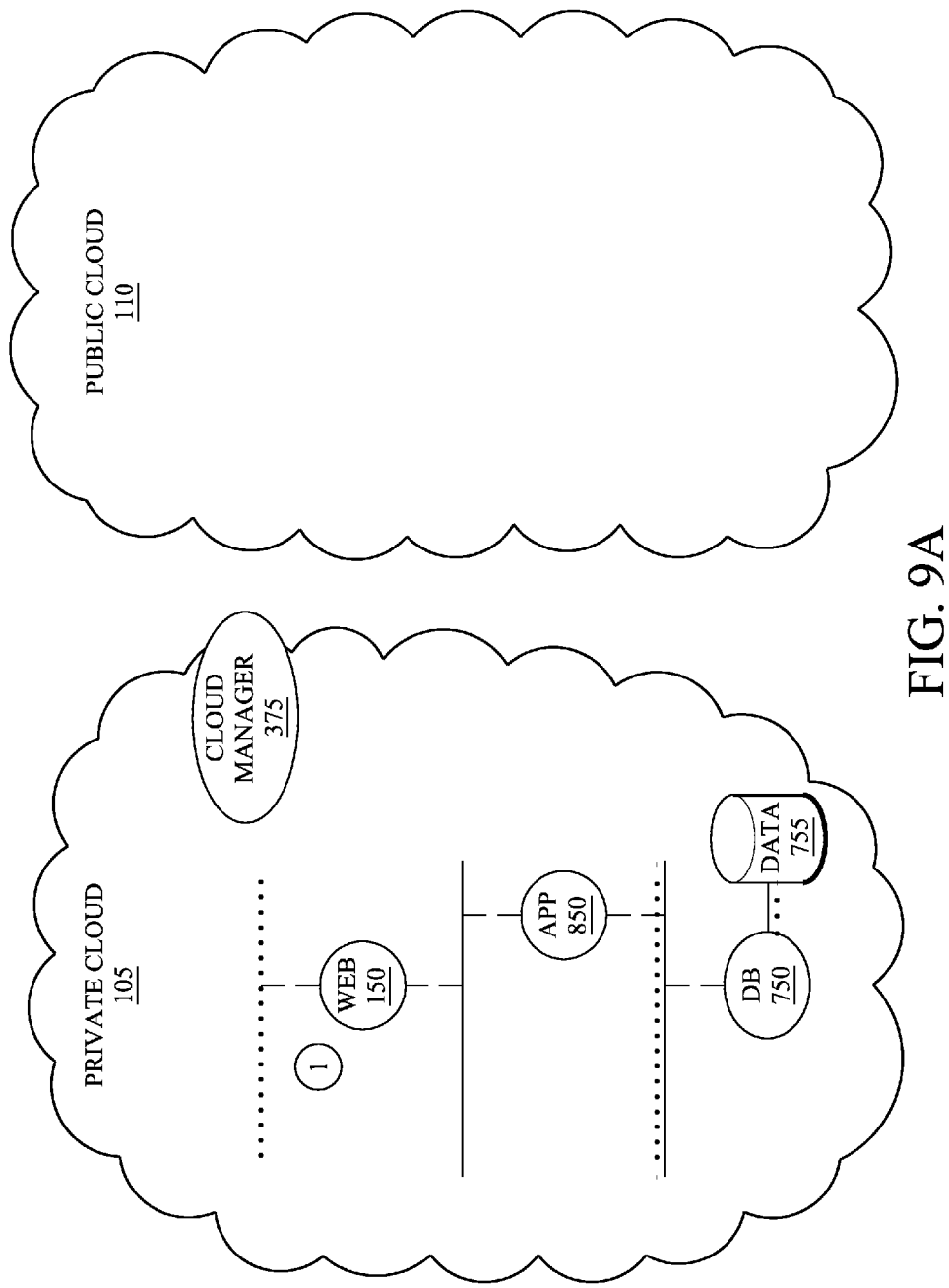
FIGS. 9A-9C illustrate an example of moving an application and associated VMs to a public cloud.
Figure 9B:
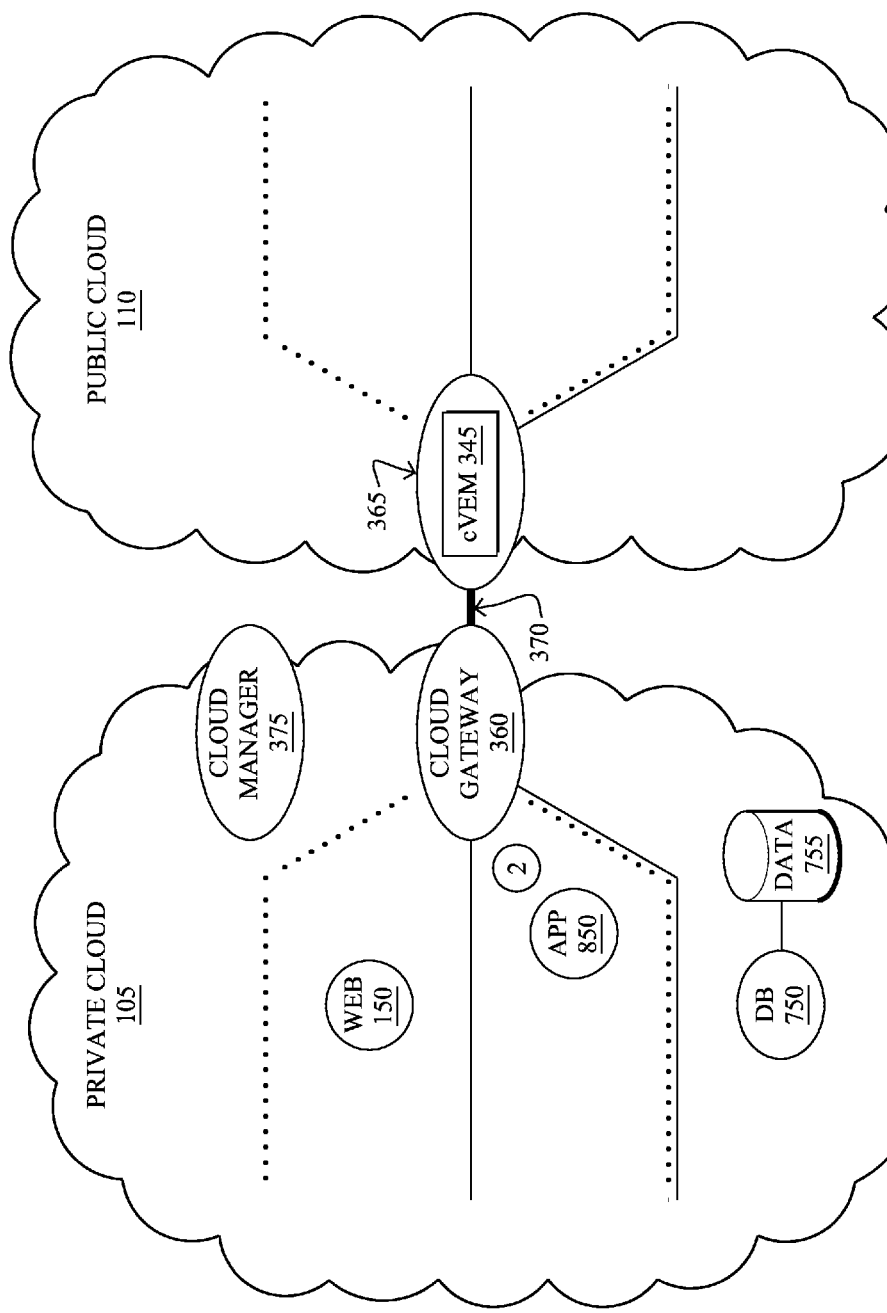
Figure 9C:
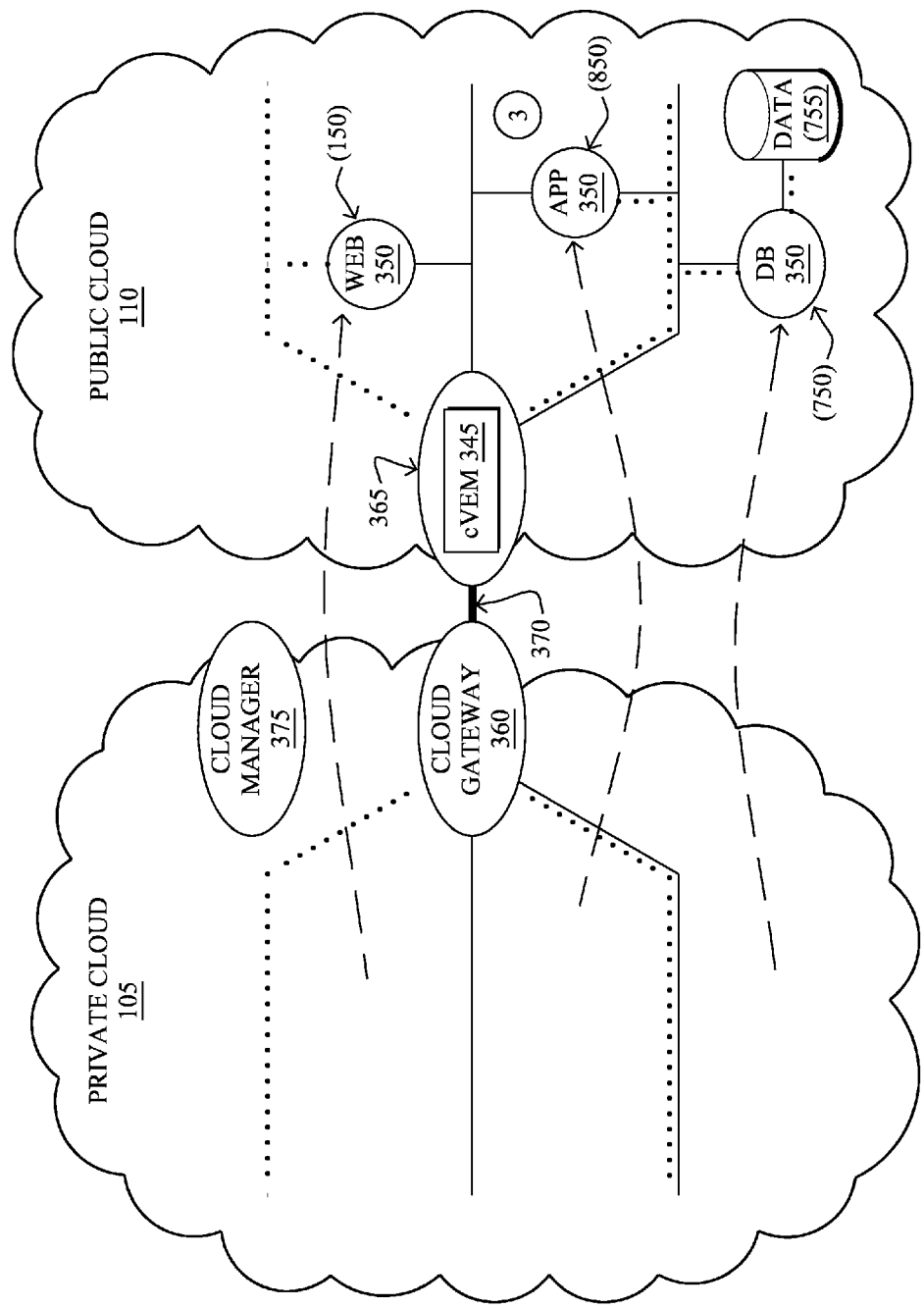

Lastly, FIGS. 9A-9C illustrate an example of moving an application 850 and associated VMs 150 to a public cloud. Here, as shown in FIG. 9A, all VMs 150/750/850 may be shut off (dotted lines), and requested to be moved to the public cloud. As such, as shown in FIG. 9B, the cloud manager 375 creates a number of public cloud network segments (tunnel 370, etc.), and in FIG. 9C instantiates VM containers 350 and transfers the corresponding VM images and data for each for activation.

Figure 10:
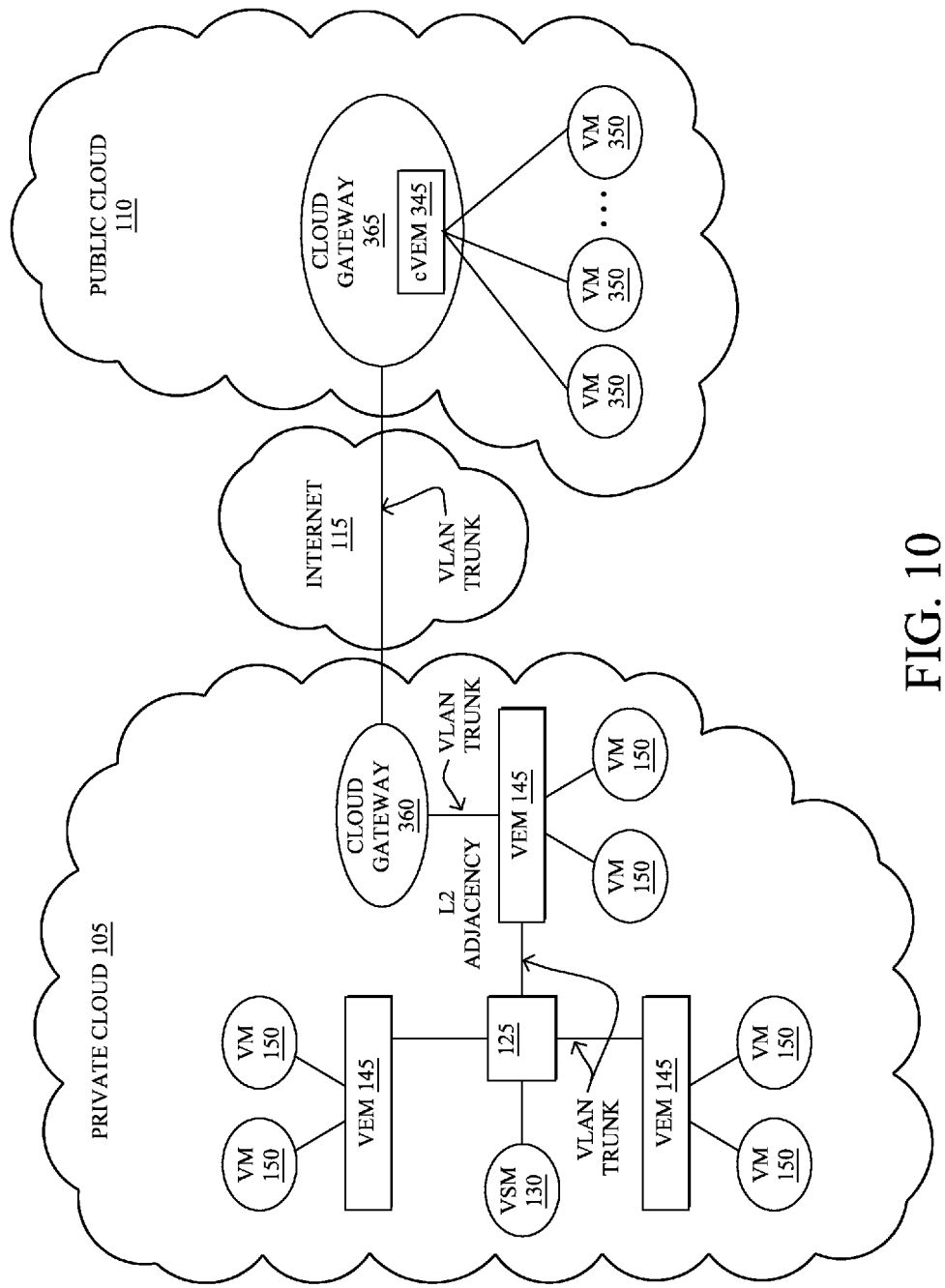
FIG. 10 illustrates an alternative connection to the private cloud networks of the cloud network element as in FIG. 3.

Notably, FIG. 10 illustrates an alternative connection of the cloud network element as in FIG. 3. Namely, while the cloud gateway 360 of the private cloud may be attached to the switch 125 (as shown in FIG. 3), the alternative embodiment shown in FIG. 10 provides for the cloud gateway 360 of the private cloud to be attached to a VEM 145 of the private cloud. In particular, where the VEM 145 supports VLAN configuration, an L2 adjacency may be established using a VLAN trunk to the cloud gateway 360 and also via the secure L4 tunnel 370 to cloud gateway 365 of the public cloud 110.

Figure 11:
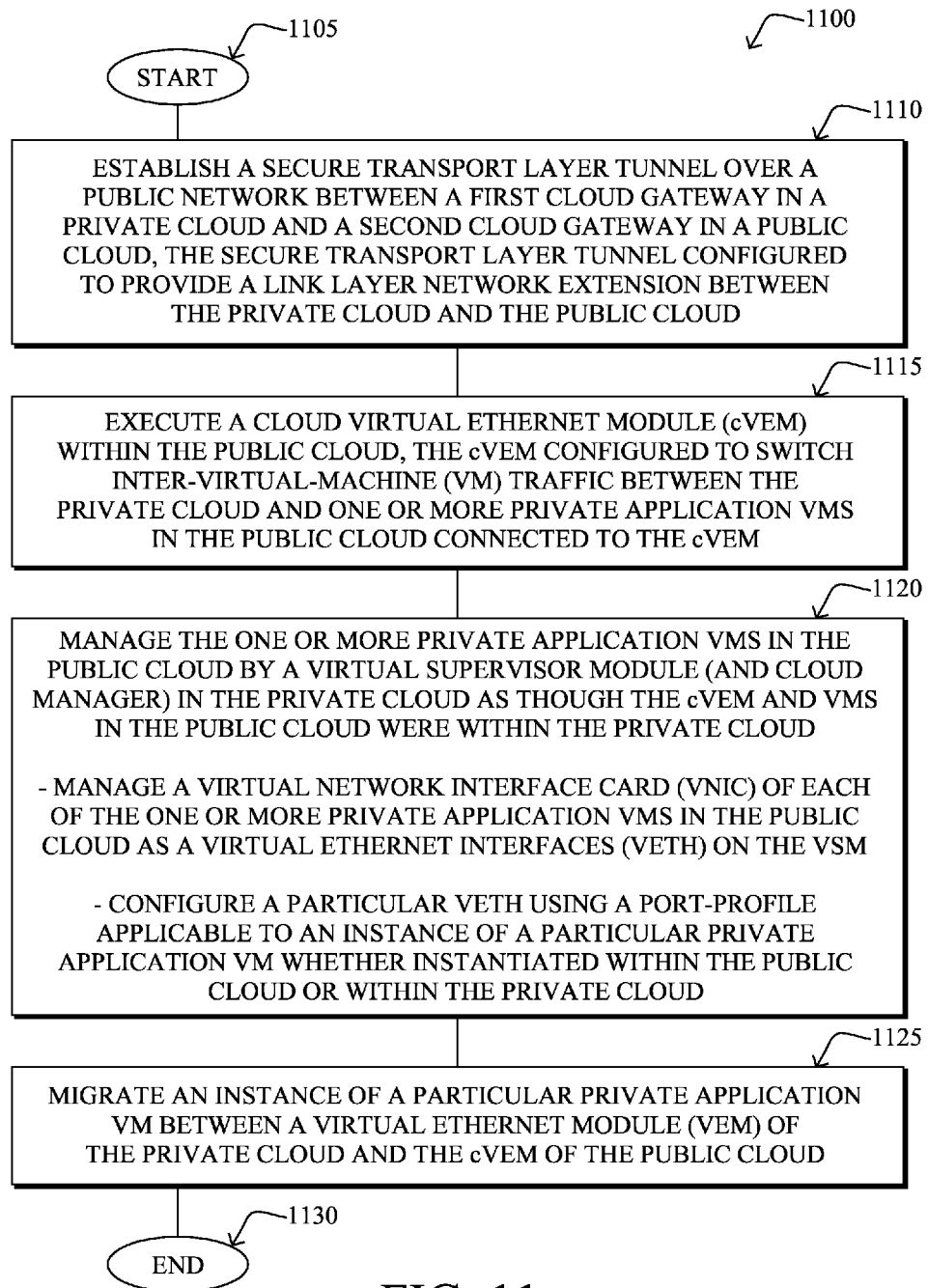
FIG. 11 illustrates an example simplified procedure for a distributed virtual switch architecture for a hybrid cloud in accordance with one or more embodiments described herein.

FIG. 11 illustrates an example simplified procedure for a distributed virtual switch architecture for a hybrid cloud in accordance with one or more embodiments described herein. The procedure 1100 starts at step 1105, and continues to step 1110, where, as described in greater detail above, a secure transport layer (e.g., L4) tunnel 370 is established over a public network 115 between a first cloud gateway 360 in a private cloud 105 and a second cloud gateway 365 in a public cloud 110. As described above, the secure transport layer tunnel 370 is configured to provide a link layer (e.g., L2) network extension between the private cloud and the public cloud. In step 1115, a cVEM 345 is executed/instantiated within the public cloud 110, such that the cVEM may switch inter-VM traffic between the private cloud and one or more private application VMs 350 in the public cloud connected to the cVEM.

Illustratively, in step 1120, the one or more private application VMs 350 in the public cloud may be managed by a VSM 130 (e.g., and cloud manager 375) in the private cloud 105 as though the cVEM 365 and VMs 350 in the public cloud 110 were within the private cloud. For instance, as described above, a vNIC of each of the one or more private application VMs 350 in the public cloud may be managed as a veth on the VSM 130, and veths may be configured using a port-profile applicable to an instance of a particular private application VM whether instantiated within the public cloud or within the private cloud. As such, in step 1125, instances of a particular private application VM may be seamlessly migrated between a VEM 145 of the private cloud and the cVEM 345 of the public cloud. The procedure 1100 may illustratively end at step 1130, with the option to continue migrating VMs or even to establish (or tear down) the secure tunnel 370 on-demand.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 1100 is described as a single procedure, certain steps from the procedure may be incorporated into other procedures (e.g., performed by other devices, modules, or systems), and the procedure shown is not meant to be limited to operation by a single device, module, or system.

The techniques described herein, therefore, provide for a distributed virtual switch architecture for a hybrid cloud. In particular, the techniques herein illustratively create an L2 network overlay infrastructure at the cloud datacenter on demand, where the secure L2 network extension allows for customer infrastructure to remain generally unchanged (that is, the same customer network polices can be applied to the cloud resources), and without requiring any application re-architecting. In addition, the L2 network overlay is illustratively on top of an L4 Secure Tunnel, which reduces the requirement of network attachments at the cloud. Moreover, as detailed above, the dynamic nature of the L2 switch overlay provides for seamless virtual machine migration from enterprise-to-cloud, and from cloud-to-cloud. This is notably different from current systems mentioned above, where a VPN gateway is located within a private cloud and a public cloud, since such systems provide an L3 extension only, creating subnets of the private cloud network within the public cloud. Unlike the techniques above, however, these current systems do not allow for transparent, seamless VM migration, and require provisioning for changes to both IP and MAC addresses as a result of an L3 extension migration.

While there have been shown and described illustrative embodiments that provide for a distributed virtual switch architecture for a hybrid cloud, it is to be understood that various other adaptations and modifications may be made within the spirit and scope of the embodiments herein. For example, the embodiments have been shown and described herein with relation to "enterprise" networks. However, the embodiments in their broader sense are not as limited, and may, in fact, be used with other types of private cloud networks and/or protocols interacting with various types of public clouds.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   establishing a secure transport layer tunnel over a public network between a first cloud gateway in a private cloud and a second cloud gateway in a public cloud, the secure transport layer tunnel configured to provide a link layer network extension between the private cloud and the public cloud that creates a secure link layer network overlay infrastructure at a cloud data center on demand, wherein the secure link layer network overlay infrastructure allows for same customer network polices to be applied to the cloud resources without requiring application re-architecting;
   executing a cloud virtual Ethernet module (cVEM) within the public cloud, the cVEM configured to switch inter-virtual-machine (VM) traffic between the private cloud and one or more private application VMs in the public cloud connected to the cVEM;
   managing the one or more private application VMs in the public cloud by a virtual supervisor module (VSM) in the private cloud as though the cVEM and VMs in the public cloud were within the private cloud; and
   migrating an instance of a particular private application VM between a virtual Ethernet module (VEM) of the private cloud and the cVEM of the public cloud on demand.

2. The method as in claim 1, further comprising:
   managing a virtual network interface card (vNIC) of each of the one or more private application VMs in the public cloud as a virtual Ethernet interfaces (veth) on the VSM.

3. The method as in claim 2, further comprising:
   configuring a particular veth using a port-profile applicable to an instance of a particular private application VM when instantiated within the public cloud or within the private cloud.

4. The method as in claim 1, further comprising:
   instantiating the first cloud gateway and second cloud gateway by a cloud manager within the public cloud.

5. The method as in claim 1, further comprising:
   monitoring health of the first and second cloud gateways, the one or more private application VMs, the cVEM, and the secure transport layer tunnel by a cloud manager within the public cloud.

6. The method as in claim 1, further comprising:
   embedding the cVEM within the second cloud gateway.

7. The method as in claim 1, further comprising:
   attaching the first cloud gateway as a VM to one of either a switch of the private cloud or to a virtual Ethernet module (VEM) of the private cloud that is attached to the switch.

8. A system, comprising:
   a first cloud gateway device in a private cloud;
   a second cloud gateway device in a public cloud;
   a secure transport layer tunnel over a public network between the first cloud gateway device in the private cloud and the second cloud gateway device in the public cloud, the secure transport layer tunnel configured to provide a link layer network extension between the private cloud and the public cloud that creates a secure link layer network overlay infrastructure at a cloud data center on demand, wherein the secure link layer network overlay infrastructure allows for same customer network polices to be applied to the cloud resources without requiring application re-architecting;
   a cloud virtual Ethernet module (cVEM) executed within the public cloud; and
   one or more private application virtual machines (VMs) in the public cloud connected to the cVEM, wherein the cVEM is configured to switch inter-VM traffic between the private cloud and the one or more private application VMs;
   a virtual supervisor module (VSM) in the private cloud configured to manage the one or more private application VMs in the public cloud as though the cVEM and VMs in the public cloud were within the private cloud; and
   a cloud manager within the public cloud and configured to migrate an instance of a particular private application VM between a virtual Ethernet module (VEM) of the private cloud and the cVEM of the public cloud on demand.

9. The system as in claim 8, wherein the VSM is further configured to manage a virtual network interface card (vNIC)

of each of the one or more private application VMs in the public cloud as a virtual Ethernet interfaces (veth) on the VSM.

10. The system as in claim 9, wherein the VSM is further configured to configure a particular veth using a port-profile applicable to an instance of a particular private application VM when instantiated within the public cloud or within the private cloud.

11. The system as in claim 8, further comprising:
a cloud manager within the private cloud and configured to instantiate the first cloud gateway and second cloud gateway device.

12. The system as in claim 8, further comprising:
a cloud manager within the private cloud and configured to monitor health of the first and second cloud gateway devices, the one or more private application VMs, the cVEM, and the secure transport layer tunnel.

13. The system as in claim 8, wherein the cVEM is embedded within the second cloud gateway device.

14. The system as in claim 8, further comprising:
a switch of the private cloud, wherein the first cloud gateway device is attached as a VM to one of either the switch or to a virtual Ethernet module (VEM) of the private cloud that is attached to the switch.

15. A tangible, non-transitory, computer-readable media having software encoded thereon, the software when executed by a processor operable to:

establish a secure transport layer tunnel over a public network between a first cloud gateway in a private cloud and a second cloud gateway in a public cloud, the secure transport layer tunnel configured to provide a link layer network extension between the private cloud and the public cloud that creates a secure link layer network overlay infrastructure at a cloud data center on demand, wherein the secure link layer network overlay infrastructure allows for same customer network polices to be applied to the cloud resources without requiring application re-architecting; and instantiate a cloud virtual Ethernet module (cVEM) within the public cloud, the cVEM configured to switch inter-virtual-machine (VM) traffic between the private cloud and one or more private application VMs in the public cloud connected to the cVEM; and migrate an instance of a particular private application VM between a virtual Ethernet module (VEM) of the private cloud and the cVEM of the public cloud, wherein the particular private application VM is managed by the virtual supervisor module (VSM) of the private cloud as though the cVEM and VMs in the public cloud were within the private cloud.

* * * * *